(12) United States Patent
Nagatomo et al.

(10) Patent No.: US 7,493,138 B2
(45) Date of Patent: Feb. 17, 2009

(54) PORTABLE WIRELESS COMMUNICATION TERMINAL, PICKED-UP IMAGE EDITING APPARATUS, AND PICKED-UP IMAGE EDITING METHOD

(75) Inventors: Shoichi Nagatomo, Fussa (JP); Shinichi Furuta, Higashiyamato (JP); Atsushi Homma, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 749 days.

(21) Appl. No.: 10/914,935

(22) Filed: Aug. 9, 2004

(65) Prior Publication Data
US 2005/0010568 A1 Jan. 13, 2005

Related U.S. Application Data

(63) Continuation of application No. PCT/JP03/15291, filed on Nov. 28, 2003.

(30) Foreign Application Priority Data

Nov. 29, 2002 (JP) ............................. 2002-346895
Oct. 8, 2003 (JP) ............................. 2003-349458

(51) Int. Cl.
*H04M 1/00* (2006.01)
*H04M 3/42* (2006.01)
*H04B 1/38* (2006.01)
*G06F 17/30* (2006.01)
*G06F 7/00* (2006.01)
*H04N 7/16* (2006.01)

(52) U.S. Cl. .................... 455/550.1; 455/415; 455/566; 455/567; 707/9; 707/10; 726/32

(58) Field of Classification Search ............. 455/550.1, 455/415, 566, 567; 707/3, 9, 10; 726/32
See application file for complete search history.

(56) References Cited

U.S. PATENT DOCUMENTS 6,243,594 B1 * 6/2001 Silberfenig .............. 455/556.1

(Continued)

FOREIGN PATENT DOCUMENTS

KR   10-2001-38360   5/2001

OTHER PUBLICATIONS

"Digital Rights Management Version 1.0 Proposed Version." Jun. 28, 2002. Open Mobile Alliance. <www.openmobilealliance.org>.

(Continued)

*Primary Examiner*—Vincent P Harper
*Assistant Examiner*—Ariel Balaoing
(74) *Attorney, Agent, or Firm*—Frishauf, Holtz, Goodman & Chick, P.C.

(57) ABSTRACT

A picked-up image editing apparatus comprises a memory which stores a mixture of multimedia data with processing disable information and multimedia data without processing disable information, an image pick-up device which picks-up an image of an object as one of a still picture and a motion picture, an image data producing unit which produces image data based on an image picked-up by the image pick-up device, a combining instruction issuing unit which issues a combining instruction to combine the produced image data with the multimedia data stored in the memory, and an output content storing unit which, when the multimedia data targeted to be combined has processing disable information, stores only output contents based on a processing result.

10 Claims, 28 Drawing Sheets

U.S. PATENT DOCUMENTS

| | | | |
|---|---|---|---|
| 2001/0013039 A1* | 8/2001 | Choi | 707/104.1 |
| 2001/0021649 A1* | 9/2001 | Kinnunen et al. | 455/412 |
| 2001/0023417 A1 | 9/2001 | Stefik et al. | |
| 2002/0073214 A1 | 6/2002 | Iinuma | |
| 2002/0077988 A1* | 6/2002 | Sasaki et al. | 705/59 |
| 2002/0120586 A1* | 8/2002 | Masaki et al. | 705/75 |
| 2002/0135695 A1* | 9/2002 | Edelson et al. | 348/439.1 |
| 2003/0224773 A1* | 12/2003 | Deeds | 455/419 |
| 2004/0145660 A1* | 7/2004 | Kusaka | 348/211.2 |
| 2004/0203835 A1* | 10/2004 | Trottier et al. | 455/454 |
| 2004/0235494 A1* | 11/2004 | Matsumoto et al. | 455/456.1 |
| 2004/0260716 A1* | 12/2004 | Sugiura | 707/102 |
| 2005/0234828 A1* | 10/2005 | Matsuyama et al. | 705/51 |

OTHER PUBLICATIONS

Nokia Announcement: "Nokia 3650 technical specifications" Internet Citation, 'Online! Sep. 6, 2002, pp. 1-3, XP002275872, Retrieved from the Internet: <Url:http://www.forum.nokia.com/main/1,,015_20,00.html> retrieved on Apr. 4, 2001!.

"Digital Rights Management Version 1.0" Announcement Open Mobile Alliance, XX, XX, Sep. 5, 2002, pp. 1-21, XP002273196.

Open Mobile Alliance: "Rights Expression Language Version 1.0" Announcement Open Mobile Alliance, 'Online!—Sep. 13, 2002, p. 1-29, XP002275873, Retrieved from the Internet: <URL:http://www.openmobilealliance.org/tech/docs/DRM/OMA-Download-DRMREL-V1_0-20020913-C.pdf> retrieved on Apr. 1, 2004 !.

* cited by examiner

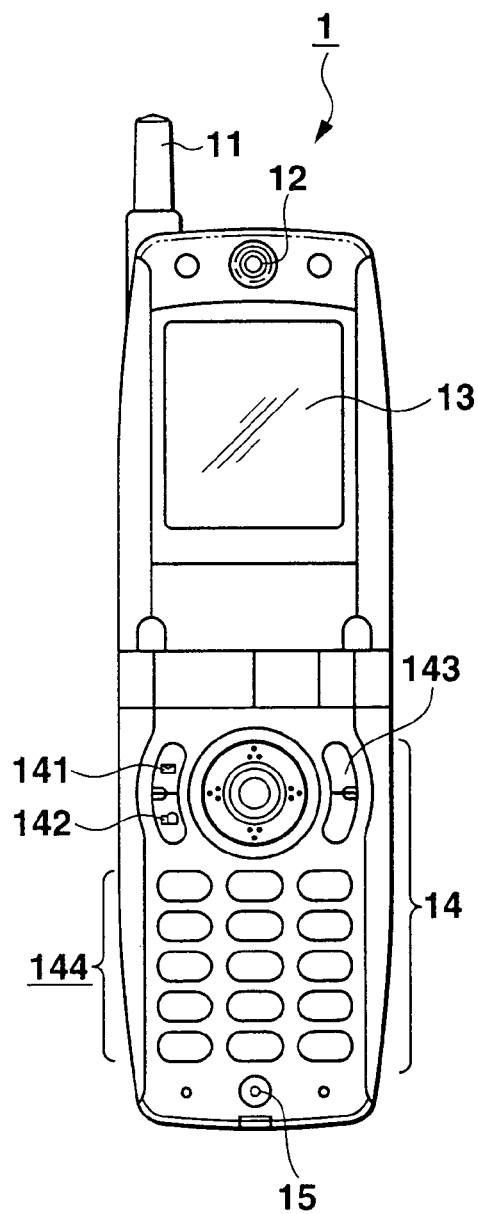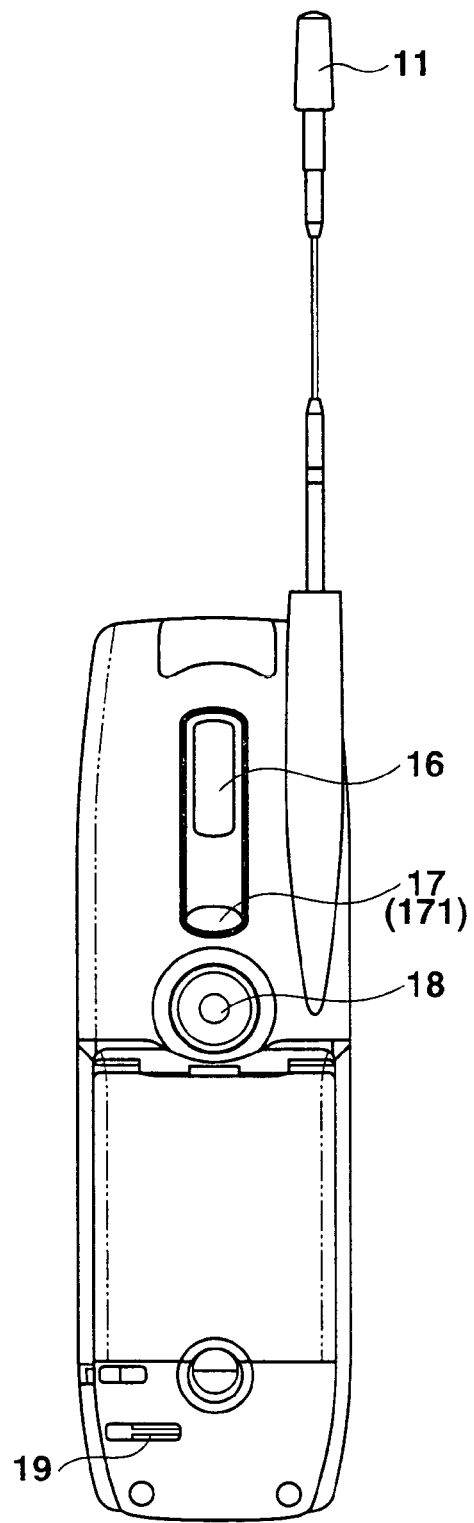

| RECORD NO. | FILE NAME | SIZE (KB) | FOLDER ATTRIBUTE | FOLDER TITLE | FILE ATTRIBUTE | COPYRIGHT FLAG |
|---|---|---|---|---|---|---|
| 001 | 20020830.amc | 100 | 001 | MOVIE | MOTION PICTURE | 0 |
| 002 | taro.jpg | 7 | 002 | MY PHOTO | STILL PICTURE | 0 |
| 003 | 2002070101.qcp | 10 | 003 | MY SOUND | VOICE | 0 |
| 004 | cinema01.amc | 240 | 001 | MOVIE | MOTION PICTURE | 1 |
| 005 | moviecm.amc | 180 | 001 | MOVIE | MOTION PICTURE (NO SOUND) | 1 |
| 006 | moviesound.amc | 120 | 001 | MOVIE | MOTION PICTURE (SOUND ONLY) | 1 |
| 007 | chakumero01.pmd | 4 | 003 | SOUND | VOICE | 0 |
| 008 | chakumero02.pmd | 4 | 003 | SOUND | VOICE | 1 |
| 009 | chakumero03.mmf | 7 | 003 | SOUND | VOICE | 0 |
| 010 | chakumero04.mmf | 7 | 002 | SOUND | VOICE | 1 |
| 011 | graphic01.bmp | 10 | 002 | GRAPHIC | STILL PICTURE | 0 |
| 012 | ido101.jpg | 8 | 002 | GRAPHIC | STILL PICTURE | 1 |
| 013 | contents.png | 6 | 002 | GRAPHIC | STILL PICTURE | 1 |
| 014 | animation01.pmd | 9 | 004 | ANIMATION | MOTION PICTURE | 0 |
| 015 | myanimation.gif | 7 | 004 | ANIMATION | MOTION PICTURE (NO SOUND) | 0 |
| 016 | stamp01.png | 2 | 002 | MY PHOTO | STILL PICTURE | 1 |
| 017 | stamp02.png | 2 | 002 | GRAPHIC | STILL PICTURE | 1 |
| 018 | movieframe01.gif | 4 | 004 | ANIMATION | MOTION PICTURE (NO SOUND) | 0 |
| 019 | movieframe02.gif | 5 | 004 | ANIMATION | MOTION PICTURE (NO SOUND) | 1 |

292

| RECORD NO. | DATA CONTENTS | TRANSMITTER NUMBER FLAG | CORRESPONDING ADDRESS |
|---|---|---|---|
| 001 | default | 0 | |
| | | | |

| RECORD NO. | FILE NAME | SIZE (KB) | FOLDER ATTRIBUTE | FOLDER TITLE | FILE ATTRIBUTE | COPYRIGHT FLAG |
|---|---|---|---|---|---|---|
| 001 | 20020830.amc | 100 | 001 | MOVIE | MOTION PICTURE | 0 |
| 002 | taro.jpg | 7 | 002 | MY PHOTO | STILL PICTURE | 0 |
| 003 | 20020701.qcp | 10 | 003 | MY SOUND | VOICE | 0 |
| 004 | cinema01.amc | 240 | 001 | MOVIE | MOTION PICTURE | 1 |
| 005 | moviecm.amc | 180 | 001 | MOVIE | MOTION PICTURE (NO SOUND) | 1 |
| 006 | moviesound.amc | 120 | 001 | MOVIE | MOTION PICTURE (SOUND ONLY) | 1 |
| 007 | chakumero01.pmd | 4 | 003 | SOUND | VOICE | 0 |
| 008 | chakumero02.pmd | 4 | 003 | SOUND | VOICE | 1 |
| 009 | chakumero03.mmf | 7 | 003 | SOUND | VOICE | 0 |
| 010 | chakumero04.mmf | 7 | 002 | SOUND | VOICE | 1 |
| 011 | graphic01.bmp | 10 | 002 | GRAPHIC | STILL PICTURE | 0 |
| 012 | ido101.jpg | 8 | 002 | GRAPHIC | STILL PICTURE | 1 |
| 013 | contents.png | 6 | 002 | GRAPHIC | STILL PICTURE | 1 |
| 014 | animation01.pmd | 9 | 004 | ANIMATION | MOTION PICTURE | 1 |
| 015 | myanimation.gif | 7 | 004 | ANIMATION | MOTION PICTURE (NO SOUND) | 0 |
| 016 | stamp01.png | 2 | 002 | MY PHOTO | STILL PICTURE | 0 |
| 017 | stamp02.png | 2 | 002 | GRAPHIC | STILL PICTURE | 1 |
| 018 | movieframe01.gif | 4 | 004 | ANIMATION | MOTION PICTURE (NO SOUND) | 0 |
| 019 | movieframe02.gif | 5 | 004 | ANIMATION | MOTION PICTURE (NO SOUND) | 1 |
| 020 | fuukei.jpg | 12 | 002 | MY PHOTO | STILL PICTURE | 0 |

292

| RECORD NO. | DATA CONTENTS | TRANSMITTER NUMBER FLAG | CORRESPONDING ADDRESS |
|---|---|---|---|
| 001 | default | 0 | |
| 002 | 020+017(0, 0) | 0 | |

| RECORD NO. | FILE NAME | SIZE (KB) | FOLDER ATTRIBUTE | FOLDER TITLE | FILE ATTRIBUTE | COPYRIGHT FLAG |
|---|---|---|---|---|---|---|
| 001 | 20020830.amc | 100 | 001 | MOVIE | MOTION PICTURE | 0 |
| 002 | taro.jpg | 7 | 002 | MY PHOTO | STILL PICTURE | 0 |
| 003 | 2002070101.qcp | 10 | 003 | MY SOUND | VOICE | 0 |
| 004 | cinema01.amc | 240 | 001 | MOVIE | MOTION PICTURE | 1 |
| 005 | moviecm.amc | 180 | 001 | MOVIE | MOTION PICTURE (NO SOUND) | 1 |
| 006 | moviesound.amc | 120 | 001 | MOVIE | MOTION PICTURE (SOUND ONLY) | 1 |
| 007 | chakumero01.pmd | 4 | 003 | SOUND | VOICE | 0 |
| 008 | chakumero02.pmd | 4 | 003 | SOUND | VOICE | 1 |
| 009 | chakumero03.mmf | 7 | 003 | SOUND | VOICE | 0 |
| 010 | chakumero04.mmf | 7 | 002 | SOUND | VOICE | 1 |
| 011 | graphic01.bmp | 10 | 002 | GRAPHIC | STILL PICTURE | 0 |
| 012 | ido101.jpg | 8 | 002 | GRAPHIC | STILL PICTURE | 1 |
| 013 | contents.png | 6 | 002 | GRAPHIC | STILL PICTURE | 1 |
| 014 | animation01.pmd | 9 | 004 | ANIMATION | MOTION PICTURE | 1 |
| 015 | myanimation.gif | 7 | 004 | ANIMATION | MOTION PICTURE (NO SOUND) | 0 |
| 016 | stamp01.png | 2 | 002 | MY PHOTO | STILL PICTURE | 0 |
| 017 | stamp02.png | 2 | 002 | GRAPHIC | STILL PICTURE | 1 |
| 018 | movieframe01.gif | 4 | 004 | ANIMATION | MOTION PICTURE (NO SOUND) | 0 |
| 019 | movieframe02.gif | 5 | 004 | ANIMATION | MOTION PICTURE (NO SOUND) | 1 |
| 020 | fuukei.jpg | 12 | 002 | MY PHOTO | STILL PICTURE | 0 |
| 021 | chakufuukei.jpg | 14 | 002 | MY PHOTO | STILL PICTURE | 0 |

| RECORD NO. | DATA CONTENTS | TRANSMITTER NUMBER FLAG | CORRESPONDING ADDRESS |
|---|---|---|---|
| 001 | default | 0 | |
| 002 | 021 | 0 | |

| RECORD NO. | DATA CONTENTS | TRANSMITTER NUMBER FLAG | CORRESPONDING ADDRESS |
|---|---|---|---|
| 001 | default | 0 | |
| 002 | 020+017(0, 0)+008 | 0 | |

| RECORD NO. | DATA CONTENTS | TRANSMITTER NUMBER FLAG | CORRESPONDING ADDRESS |
|---|---|---|---|
| 001 | default | 0 | |
| 002 | 021+008 | 0 | |

| RECORD NO. | FILE NAME | SIZE (KB) | FOLDER ATTRIBUTE | FOLDER TITLE | FILE ATTRIBUTE | COPYRIGHT FLAG |
|---|---|---|---|---|---|---|
| 001 | 20020830.amc | 100 | 001 | MOVIE | MOTION PICTURE | 0 |
| 002 | taro.jpg | 7 | 002 | MY PHOTO | STILL PICTURE | 0 |
| 003 | 2002070101.qcp | 10 | 003 | MY SOUND | VOICE | 0 |
| 004 | cinema01.amc | 240 | 001 | MOVIE | MOTION PICTURE | 1 |
| 005 | moviecm.amc | 180 | 001 | MOVIE | MOTION PICTURE (NO SOUND) | 1 |
| 006 | moviesound.amc | 120 | 001 | MOVIE | MOTION PICTURE (SOUND ONLY) | 1 |
| 007 | chakumero01.pmd | 4 | 003 | SOUND | VOICE | 0 |
| 008 | chakumero02.pmd | 4 | 003 | SOUND | VOICE | 1 |
| 009 | chakumero03.mmf | 7 | 003 | SOUND | VOICE | 0 |
| 010 | chakumero04.mmf | 7 | 002 | SOUND | VOICE | 1 |
| 011 | graphic01.bmp | 10 | 002 | GRAPHIC | STILL PICTURE | 0 |
| 012 | ido101.jpg | 8 | 002 | GRAPHIC | STILL PICTURE | 1 |
| 013 | contents.png | 6 | 002 | GRAPHIC | STILL PICTURE | 1 |
| 014 | animation01.pmd | 9 | 004 | ANIMATION | MOTION PICTURE | 1 |
| 015 | myanimation.gif | 7 | 004 | ANIMATION | MOTION PICTURE (NO SOUND) | 0 |
| 016 | stamp01.png | 2 | 002 | MY PHOTO | STILL PICTURE | 0 |
| 017 | stamp02.png | 2 | 002 | GRAPHIC | STILL PICTURE | 1 |
| 018 | movieframe01.gif | 4 | 004 | ANIMATION | MOTION PICTURE (NO SOUND) | 0 |
| 019 | movieframe02.gif | 5 | 004 | ANIMATION | MOTION PICTURE (NO SOUND) | 1 |
| 020 | fuukei.jpg | 12 | 002 | MY PHOTO | STILL PICTURE | 0 |
| 021 | chakufuukei.gif | 16 | | | | 0 |

| RECORD NO. | FILE NAME | SIZE (KB) | FOLDER ATTRIBUTE | FOLDER TITLE | FILE ATTRIBUTE | COPYRIGHT FLAG |
|---|---|---|---|---|---|---|
| 001 | 20020830.amc | 100 | 001 | MOVIE | MOTION PICTURE | 0 |
| 002 | taro.jpg | 7 | 002 | MY PHOTO | STILL PICTURE | 0 |
| 003 | 2002070101.qcp | 10 | 003 | MY SOUND | VOICE | 0 |
| 004 | cinema01.amc | 240 | 001 | MOVIE | MOTION PICTURE | 1 |
| 005 | moviecm.amc | 180 | 001 | MOVIE | MOTION PICTURE (NO SOUND) | 1 |
| 006 | moviesound.amc | 120 | 001 | MOVIE | MOTION PICTURE (SOUND ONLY) | 1 |
| 007 | chakumero01.pmd | 4 | 003 | SOUND | VOICE | 0 |
| 008 | chakumero02.pmd | 4 | 003 | SOUND | VOICE | 1 |
| 009 | chakumero03.mmf | 7 | 003 | SOUND | VOICE | 0 |
| 010 | chakumero04.mmf | 7 | 002 | SOUND | VOICE | 1 |
| 011 | graphic01.bmp | 10 | 002 | GRAPHIC | STILL PICTURE | 0 |
| 012 | ido101.jpg | 8 | 002 | GRAPHIC | STILL PICTURE | 1 |
| 013 | contents.png | 6 | 002 | GRAPHIC | STILL PICTURE | 1 |
| 014 | animation01.pmd | 9 | 004 | ANIMATION | MOTION PICTURE | 1 |
| 015 | myanimation.gif | 7 | 004 | ANIMATION | MOTION PICTURE (NO SOUND) | 0 |
| 016 | stamp01.png | 2 | 002 | MY PHOTO | STILL PICTURE | 0 |
| 017 | stamp02.png | 2 | 002 | GRAPHIC | STILL PICTURE | 1 |
| 018 | movieframe01.gif | 4 | 004 | ANIMATION | MOTION PICTURE (NO SOUND) | 0 |
| 019 | movieframe02.gif | 5 | 004 | ANIMATION | MOTION PICTURE (NO SOUND) | 1 |
| 020 | fuukei.jpg | 12 | 002 | MY PHOTO | STILL PICTURE | 0 |
| 021 | chakufuukei.pmd | 20 | 004 | ANIMATION | MOTION PICTURE | 0 |

| RECORD NO. | FILE NAME | SIZE (KB) | FOLDER ATTRIBUTE | FOLDER TITLE | FILE ATTRIBUTE | COPYRIGHT FLAG |
|---|---|---|---|---|---|---|
| 001 | 20020830.amc | 100 | 001 | MOVIE | MOTION PICTURE | 0 |
| 002 | taro.jpg | 7 | 002 | MY PHOTO | STILL PICTURE | 0 |
| 003 | 2002070101.qcp | 10 | 003 | MY SOUND | VOICE | 0 |
| 004 | cinema01.amc | 240 | 001 | MOVIE | MOTION PICTURE | 1 |
| 005 | moviecm.amc | 180 | 001 | MOVIE | MOTION PICTURE (NO SOUND) | 1 |
| 006 | moviesound.amc | 120 | 001 | MOVIE | MOTION PICTURE (SOUND ONLY) | 1 |
| 007 | chakumero01.pmd | 4 | 003 | SOUND | VOICE | 0 |
| 008 | chakumero02.pmd | 4 | 003 | SOUND | VOICE | 1 |
| 009 | chakumero03.mmf | 7 | 003 | SOUND | VOICE | 0 |
| 010 | chakumero04.mmf | 7 | 002 | SOUND | VOICE | 1 |
| 011 | graphic01.bmp | 10 | 002 | GRAPHIC | STILL PICTURE | 0 |
| 012 | ido101.jpg | 8 | 002 | GRAPHIC | STILL PICTURE | 1 |
| 013 | contents.png | 6 | 002 | GRAPHIC | STILL PICTURE | 1 |
| 014 | animation01.pmd | 9 | 004 | ANIMATION | MOTION PICTURE | 1 |
| 015 | myanimation.gif | 7 | 004 | ANIMATION | MOTION PICTURE (NO SOUND) | 0 |
| 016 | stamp01.png | 2 | 002 | MY PHOTO | STILL PICTURE | 0 |
| 017 | stamp02.png | 2 | 002 | GRAPHIC | STILL PICTURE | 1 |
| 018 | movieframe01.gif | 4 | 004 | ANIMATION | MOTION PICTURE (NO SOUND) | 0 |
| 019 | movieframe02.gif | 5 | 004 | ANIMATION | MOTION PICTURE (NO SOUND) | 1 |
| 020 | car.amc | 60 | 001 | MOVIE | MOTION PICTURE | 0 |

| RECORD NO. | FILE NAME | SIZE (KB) | FOLDER ATTRIBUTE | FOLDER TITLE | FILE ATTRIBUTE | COPYRIGHT FLAG |
|---|---|---|---|---|---|---|
| 001 | 20020830.amc | 100 | 001 | MOVIE | MOTION PICTURE | 0 |
| 002 | taro.jpg | 7 | 002 | MY PHOTO | STILL PICTURE | 0 |
| 003 | 2002070101.qcp | 10 | 003 | MY SOUND | VOICE | 0 |
| 004 | cinema01.amc | 240 | 001 | MOVIE | MOTION PICTURE | 1 |
| 005 | moviecm.amc | 180 | 001 | MOVIE | MOTION PICTURE (NO SOUND) | 1 |
| 006 | moviesound.amc | 120 | 001 | MOVIE | MOTION PICTURE (SOUND ONLY) | 1 |
| 007 | chakumero01.pmd | 4 | 003 | SOUND | VOICE | 0 |
| 008 | chakumero02.pmd | 4 | 003 | SOUND | VOICE | 1 |
| 009 | chakumero03.mmf | 7 | 003 | SOUND | VOICE | 0 |
| 010 | chakumero04.mmf | 7 | 002 | SOUND | VOICE | 1 |
| 011 | graphic01.bmp | 10 | 002 | GRAPHIC | STILL PICTURE | 0 |
| 012 | ido101.jpg | 8 | 002 | GRAPHIC | STILL PICTURE | 1 |
| 013 | contents.png | 6 | 002 | GRAPHIC | STILL PICTURE | 1 |
| 014 | animation01.pmd | 9 | 004 | ANIMATION | MOTION PICTURE | 1 |
| 015 | myanimation.gif | 7 | 004 | ANIMATION | MOTION PICTURE (NO SOUND) | 0 |
| 016 | stamp01.png | 2 | 002 | MY PHOTO | STILL PICTURE | 0 |
| 017 | stamp02.png | 2 | 002 | GRAPHIC | STILL PICTURE | 1 |
| 018 | movieframe01.gif | 4 | 004 | ANIMATION | MOTION PICTURE (NO SOUND) | 0 |
| 019 | movieframe02.gif | 5 | 004 | ANIMATION | MOTION PICTURE (NO SOUND) | 1 |
| 020 | car.amc | 60 | 001 | MOVIE | MOTION PICTURE | 0 |
| 021 | chakucar.amc | 70 | 001 | MOVIE | MOTION PICTURE | 0 |

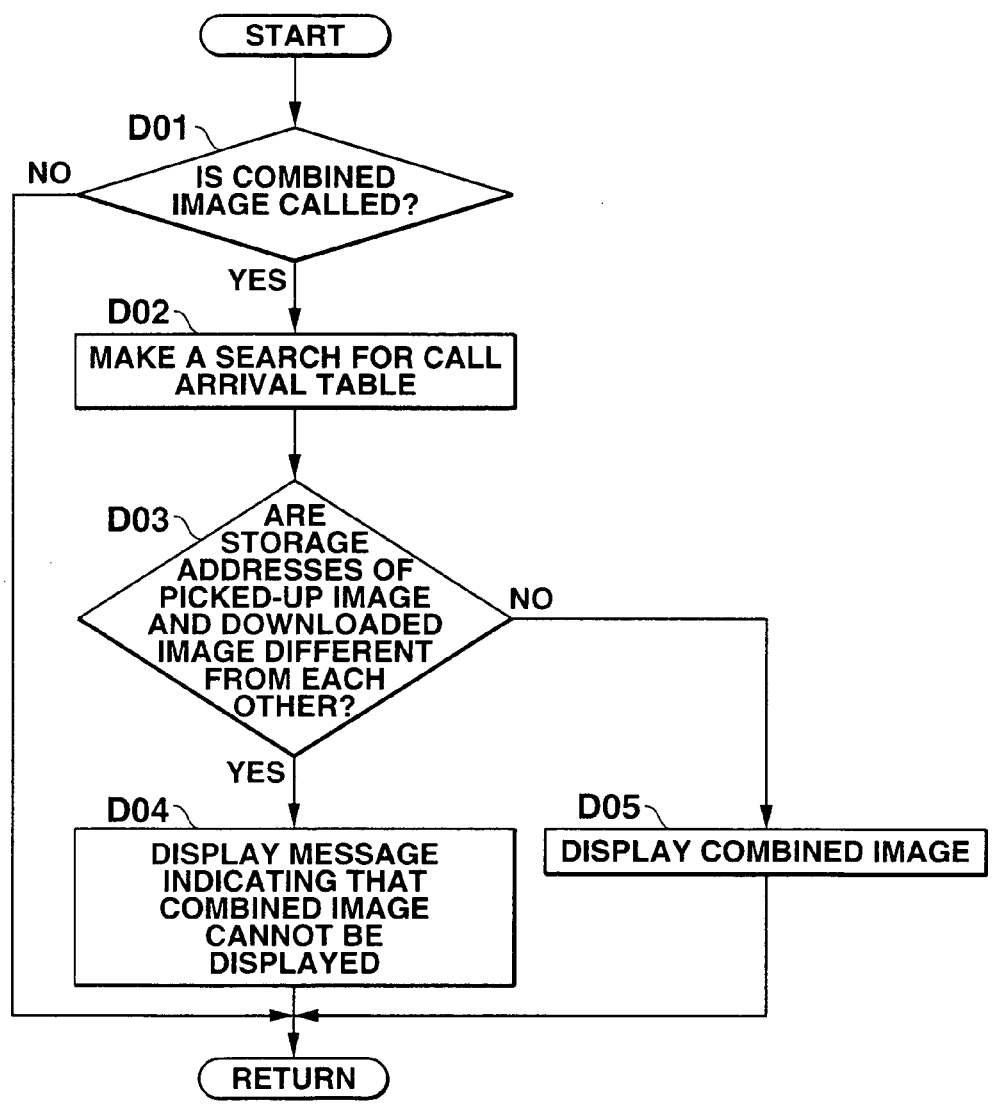

| RECORD NO. | FILE NAME | SIZE (KB) | FOLDER ATTRIBUTE | FOLDER TITLE | FILE ATTRIBUTE |
|---|---|---|---|---|---|
| 001 | 20020830.amc | 100 | 001 | MY MOVIE | MOTION PICTURE |
| 002 | taro.jpg | 7 | 002 | MY PHOTO | STILL PICTURE |
| 003 | 2002070101.qcp | 10 | 003 | MY SOUND | VOICE |
| 004 | cinema01.amc | 240 | 001 | MOVIE | MOTION PICTURE |
| 005 | moviecm.amc | 180 | 001 | MOVIE | MOTION PICTURE (NO SOUND) |
| 006 | moviesound.amc | 120 | 001 | MOVIE | MOTION PICTURE (SOUND ONLY) |
| 007 | chakumero01.pmd | 4 | 003 | MY SOUND | VOICE |
| 008 | chakumero02.pmd | 4 | 003 | SOUND | VOICE |
| 009 | chakumero03.mmf | 7 | 003 | MY SOUND | VOICE |
| 010 | chakumero04.mmf | 7 | 002 | SOUND | VOICE |
| 011 | graphic01.bmp | 10 | 002 | MY GRAPHIC | STILL PICTURE |
| 012 | ido101.jpg | 8 | 002 | GRAPHIC | STILL PICTURE |
| 013 | contents.png | 6 | 002 | GRAPHIC | STILL PICTURE |
| 014 | animation01.pmd | 9 | 004 | ANIMATION | MOTION PICTURE |
| 015 | myanimation.gif | 7 | 004 | MY ANIMATION | MOTION PICTURE (NO SOUND) |
| 016 | stamp01.png | 2 | 002 | MY PHOTO | STILL PICTURE |
| 017 | stamp02.png | 2 | 002 | GRAPHIC | STILL PICTURE |
| 018 | movieframe01.gif | 4 | 004 | MY ANIMATION | MOTION PICTURE (NO SOUND) |
| 019 | movieframe02.gif | 5 | 004 | ANIMATION | MOTION PICTURE (NO SOUND) |

| RECORD NO. | FILE NAME | SIZE (KB) | FOLDER ATTRIBUTE | FOLDER TITLE | FILE ATTRIBUTE | DCF/Exif FLAG AREA |
|---|---|---|---|---|---|---|
| 001 | 20020830.amc | 100 | 001 | MOVIE | MOTION PICTURE | - |
| 002 | taro.jpg | 7 | 002 | MY PHOTO | STILL PICTURE | 1 |
| 003 | 2002070101.qcp | 10 | 003 | MY SOUND | VOICE | - |
| 004 | cinema01.amc | 240 | 001 | MOVIE | MOTION PICTURE | - |
| 005 | moviecm.amc | 180 | 001 | MOVIE | MOTION PICTURE (NO SOUND) | - |
| 006 | moviesound.amc | 120 | 001 | MOVIE | MOTION PICTURE (SOUND ONLY) | - |
| 007 | chakumero01.pmd | 4 | 003 | SOUND | VOICE | - |
| 008 | chakumero02.pmd | 4 | 003 | SOUND | VOICE | - |
| 009 | chakumero03.mmf | 7 | 003 | SOUND | VOICE | - |
| 010 | chakumero04.mmf | 7 | 002 | SOUND | VOICE | - |
| 011 | graphic01.bmp | 10 | 002 | GRAPHIC | STILL PICTURE | - |
| 012 | ido101.jpg | 8 | 002 | GRAPHIC | STILL PICTURE | 0 |
| 013 | contents.png | 6 | 002 | GRAPHIC | STILL PICTURE | - |
| 014 | animation01.pmd | 9 | 004 | ANIMATION | MOTION PICTURE | - |
| 015 | myanimation.gif | 7 | 004 | ANIMATION | MOTION PICTURE (NO SOUND) | - |
| 016 | stamp01.png | 2 | 002 | MY PHOTO | STILL PICTURE | - |
| 017 | stamp02.png | 2 | 002 | GRAPHIC | STILL PICTURE | - |
| 018 | movieframe01.gif | 4 | 004 | ANIMATION | MOTION PICTURE (NO SOUND) | - |
| 019 | movieframe02.gif | 5 | 004 | ANIMATION | MOTION PICTURE (NO SOUND) | - |

PORTABLE WIRELESS COMMUNICATION TERMINAL, PICKED-UP IMAGE EDITING APPARATUS, AND PICKED-UP IMAGE EDITING METHOD

CROSS-REFERENCE TO RELATED APPLICATIONS

This is a Continuation Application of PCT Application No. PCT/JP03/15291, filed Nov. 28, 2003, which was published by the International Bureau on 17 Jun. 2004 (17. 06. 2004) under No. WO 2004/051658.

This application is based upon and claims the benefit of priority from prior Japanese Patent Applications No. 2002-346895, filed Nov. 29, 2002; and No. 2003-349458, filed Oct. 8, 2003, the entire contents of both of which are incorporated herein by reference.

BACKGROUND OF THE INVENTION

1. Field of the Invention

The present invention relates to a portable wireless communication terminal having a function for transmitting/receiving multimedia data; a picked-up image editing apparatus; and a picked-up image editing method. In particular, the present invention relates to a portable wireless communication terminal and a picked-up image editing apparatus and method having a function for combining and/or processing a downloaded image together with a picked-up image.

2. Description of the Related Art

In recent years, there has been a portable telephone (a type of portable wireless communication terminal) having a digital camera incorporated therein such that data picked-up by using this incorporated camera can be transmitted to be attached to E-mail and the data can be received and displayed.

Further, there exists a portable telephone comprising a function capable of processing picked-up data and capable of freely setting a motion picture, animation, sound (melody) or the like downloaded over a content provider as a call arrival image as is the case with a variety of multimedia data.

The thus downloaded data is often inhibited from being duplicated or processed, and information with copyright protection is added to the data in advance. However, a general user has few opportunities of recognizing them. Therefore, when an attempt is made to freely combine and/or process picked-up images, there are many cases in which such combining and/or processing are/is restricted or inhibited.

In addition, the image picked-up by the above-described portable telephone with the camera function and another image with copyright obtained by downloading it can be displayed to be combined with each other. However, the thus combined image cannot be transmitted. Therefore, after the combined image has been temporarily held in the portable telephone, when an attempt is made to transmit it via E-mail, the combined image is not displayed, and cannot be transmitted. At this time, the general user cannot understand why the combined image is not displayed and cannot be transmitted. In such a case, there has been a problem that the user has a trouble with operation, and the usability of the portable telephone is very poor.

BRIEF SUMMARY OF THE INVENTION

It is an object of the present invention to provide a portable wireless communication terminal capable of notifying the fact that multimedia data cannot be transmitted when the multimedia data targeted to be combined includes data downloaded via a network or protected by copyright information and a picked-up image editing apparatus and a picked-up image editing method incorporated in this portable wireless communication terminal.

According to an embodiment of the present invention, a portable wireless communication terminal having an acquiring device which acquires multimedia data, a wireless communication function, and a downloading function for downloading multimedia data over a network by using the wireless communication function, the portable wireless communication terminal comprises:

a memory which stores the multimedia data acquired by using the acquiring device and the multimedia data downloaded over the network;

a combining instruction issuing unit which issues a combining instruction to combine the multimedia data with each other;

a combining unit which, when the combining instruction issued by the combing instruction issuing unit is detected, reads out multimedia data to be combined from the memory, and combines the read out data;

a storage control unit which, when the multimedia data combined by the combining unit includes downloaded data, stores storage addresses of respective multimedia data stored in the memory so as to be associated with each other, and, when the multimedia data combined by the combining unit does not include downloaded data, stores the combined multimedia data in the memory;

a transmission instruction issuing unit which issues a transmission instruction to transmit the combined multimedia data to an outside of the portable communication terminal;

a determination unit which, when the multimedia data is read out by the transmission instruction issuing unit, determines whether or not the storage addresses of multimedia data are stored in the memory; and a disabling unit which, when the determining unit determines that the storage addresses of multimedia data are stored in the memory, disables transmission of the combined multimedia data.

According to another embodiment of the present invention, a picked-up image editing apparatus comprises:

a memory which stores a mixture of multimedia data with processing disable information and multimedia data without processing disable information;

an image pick-up device which picks-up an image of an object as one of a still picture and a motion picture;

an image data producing unit which produces image data based on an image picked-up by the image pick-up device;

a combining instruction issuing unit which issues a combining instruction to combine the produced image data with the multimedia data stored in the memory; and an output content storing unit which, when the multimedia data targeted to be combined has processing disable information, stores only output contents based on a processing result.

According to an embodiment of the present invention, a picked-up image editing method comprises:

storing into a memory a mixture of multimedia data with processing disable information and multimedia data without processing disable information;

picking-up an object;

producing image data based on the picked-up image;

issuing a combining instruction to combine the produced image data with the multimedia data stored in the memory; and when the multimedia data targeted to be combined has processing disable information, storing only output contents based on a processing result.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1A and FIG. 1B are external views each showing an example in which a foldable portable wireless communication terminal according to a first embodiment of the present invention is opened, wherein FIG. 1A is a plan view thereof, and FIG. 1B is a rear view thereof;

FIG. 4 is a schematic view showing an example of a configuration of a data folder management table shown in FIG. 3;

FIG. 13 is a schematic view showing an example of storage contents of the RAM data folder shown in FIG. 1;

FIG. 15 is a schematic view showing an example of contents when a combined image has been stored in the data folder shown in FIG. 3;

FIG. 16 is a schematic view showing an example of storage contents of a call arrival setting table when no copyright is attached to a combined image;

FIG. 17 is a schematic view showing an example of storage contents of a call arrival setting table when a sound is output upon call arrival when no copyright is attached to a combined image;

FIG. 18 is a schematic view showing an example of storage contents of a call arrival setting table when a sound is output upon call arrival when a copyright is attached to a combined image;

FIG. 19 is a schematic view showing an example of storage contents when a combined image produced by combining a motion picture with a still picture has been stored in the call arrival setting table shown in FIG. 3;

FIG. 20 is a schematic view showing an example of storage contents when a combined image produced by combining sound-attachment animation with a still picture has been stored in the data folder shown in FIG. 3;

FIG. 21 is a schematic view showing an example of storage contents when a motion picture file obtained by picking-up a motion picture by the portable telephone shown in FIG. 1 has been stored in the data folder shown in FIG. 3;

FIG. 22 is a schematic view showing an example of storage contents when a combined image produced by combining a motion picture which is not provided with a copyright with a still picture has been stored in the data folder shown in FIG. 3;

FIG. 26 is a flow chart showing procedures when a combined image has been called by the portable telephone shown in FIG. 1;

FIG. 29 is a schematic view showing an example of a configuration of a data folder management table shown in FIG. 28; and FIG. 30 is a schematic view showing an example of a configuration of the data folder management table shown in FIG. 28 in another embodiment.

DETAILED DESCRIPTION OF THE INVENTION

Figure 2:
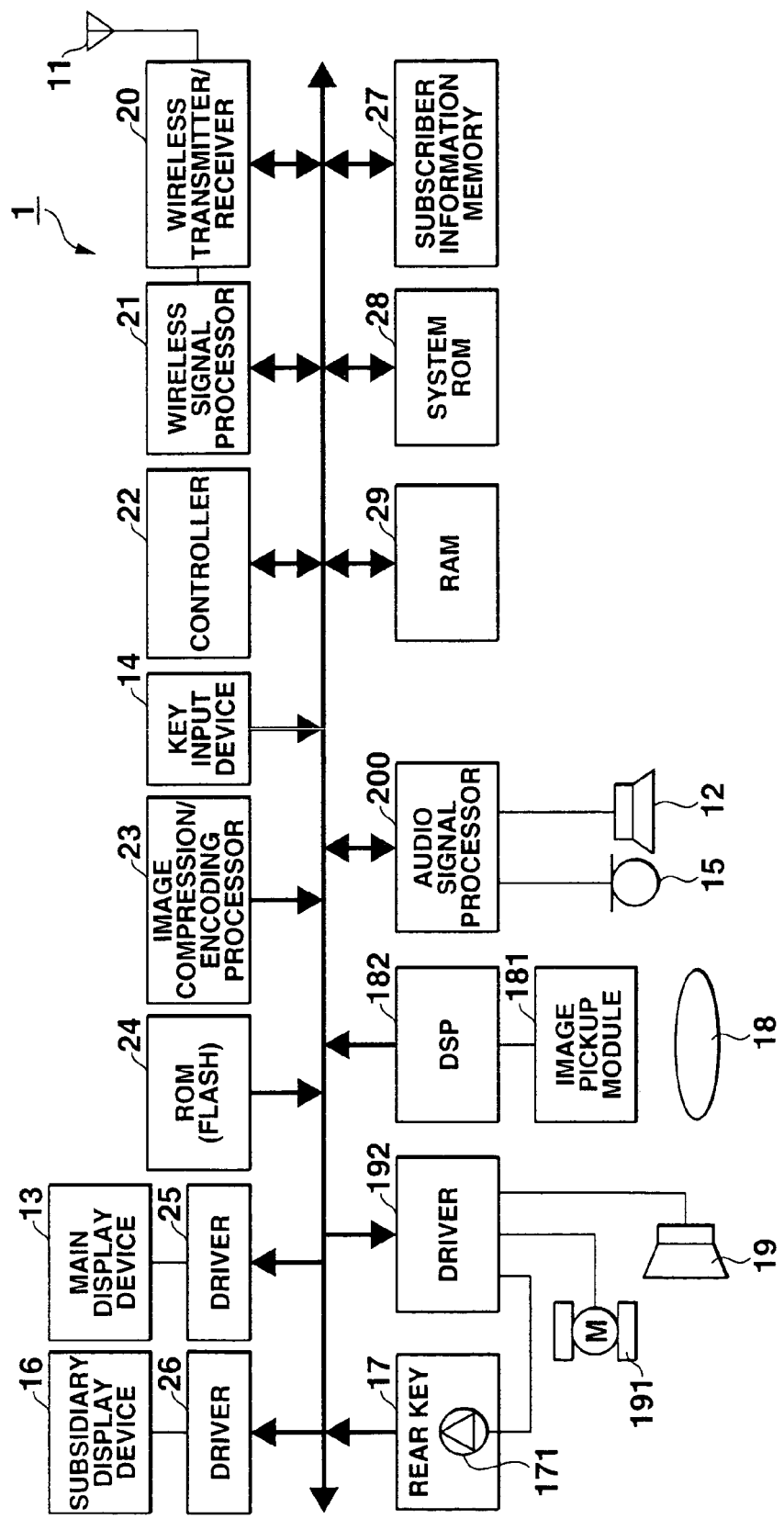
FIG. 2 is a block diagram showing an example of a circuit configuration of a portable telephone shown in FIG. 1.

Hereinafter, a first embodiment of the present invention will be described with reference to the accompanying drawings. FIGS. 1A and 1B are external views each showing an example in which a foldable portable wireless communication terminal according to one embodiment of the present invention is opened, wherein FIG. 1A is a plan view thereof, and FIG. 1B is a rear view thereof.

A portable telephone 1 is provided with a camera. This telephone has a foldable structure capable of picking-up a still picture ("JPEG" compression) and a motion picture ("MPEG" compression), the structure including a cover and main body. In this portable telephone 1, an expandable antenna 11 is provided at a rear face of the cover; a speaker 12 carrying out sound output is provided at the frontal side of the cover; and a main display device 13 with a color liquid crystal of 120 dots (wide)×160 dots (high), the main display device being capable of displaying an image and a text of E-mail with image attached is provided at the frontal side of the cover.

A key operating portion 14 is provided on a front face of the main body. This key operating portion includes a variety of function keys (such as an E-mail key 141, an address key 141, and a shutter key 143); ten numeric keys 144; and the like.

The E-mail key 141 is provided for starting up an E-mail function and displaying an E-mail menu. The address key 142 is provided for opening an address notebook used to select an E-mail address of a transmission destination.

The shutter key 143 is provided for closing a shutter which is mounted. The ten numeric keys 144 are used for telephone number or character input. A microphone 15 carrying out sound input is provided at the lower part of the main body.

A subsidiary display device 16 and a rear key 17 made of a transparent or semitransparent material are provided at the rear face of the cover, and incorporates an LED 171 emitting a light upon call arrival therein. An object lens 18 is provided at the lower part of the subsidiary display device 16 at the rear face of the cover. A loudspeaker 19 informing a call arrival or the like is provided at the rear lower part of the main body such that a buzzer is audible even in a state in which the cover is closed at the main body.

FIG. 2 is a block diagram showing an example of a circuit configuration of the portable telephone 1 shown in FIG. 1. The portable telephone 1 comprises: a wireless transmitter/receiver 20 for transmitting/receiving and modulating/demodulating a sound or text (E-mail data) via the antenna 11 in a wireless manner; a wireless signal processor 21 for carrying out processing required for wireless communication such as demodulating the sound or text (E-mail data) received by the wireless transmitter/receiver 20, or modulating a sound or text to be transmitted to the wireless transmitter/receiver 20; a controller 22 for controlling a variety of operations and a whole operation; an image compression/encoding processor 23 for compressing/encrypting an image or the like picked-up by an image pickup module 181 (including the object lens 18 and a rewritable flash ROM (not shown)) and a digital sound processor (DSP) 182; a flash ROM 24 for storing a variety of programs described later; a driver 25 for driving the display device 13; a driver 26 for driving the subsidiary display device 16; a subscriber information memory 27 for storing telephone numbers for calling the portable telephone 1 or profile data such as operator (subscriber) ID; a system ROM 28 for storing a variety of programs or the like for controlling the controller 22; a RAM 29 for storing a variety of data required for the portable wireless communication terminal, storing data required for the controller 22 to operate, and storing an image file picked-up by a picking-up portion (object lens 18, image pickup module 181, DSP 182) and compressed/encoded by a program stored in an image processing program region of the ROM 24 or an image file downloaded via WWW (World Wide Web); the image pickup module 181 including CCD or CMOS, for capturing a color image; the DSP 182 for encoding the image captured by the image pickup module 181; the broadcast speaker 19; a vibrator 191; a driver 192 for driving an LED 171; and a sound signal processor 200 for carrying out decoding a signal output from the wireless signal processor 21 and driving the speaker 12, thereby outputting a sound.

The image compression/encoding processor 23 is a circuit portion which encodes a still picture in a JPEG scheme or a motion picture in an "amc" scheme compatible with MPEG-4 scheme after capturing the still picture or motion picture picked-up by the picking-up portion (object lens 18, image pickup module 181, DSP 182) and digitally encoded and a display image (still picture or motion picture) combined when a call arrival image is produced in a camera mode described later. In addition, this portion comprises a function for downloading image data over a network by means of a system (not shown) or decoding a still picture file attached to a received E-mail (JPEG (JPG) scheme, SMP scheme, PNG scheme, GIF scheme) or a motion picture file (MPEG (AMC) ASF) scheme, GIF animation scheme). In the still picture picked-up at the picking-up portion, when the still picture is encoded in the JPEG scheme, a thumbnail image or a control tag such as a picking-up condition is set and is produced as a file based on a DCF standard or an Exif standard.

Figure 3:
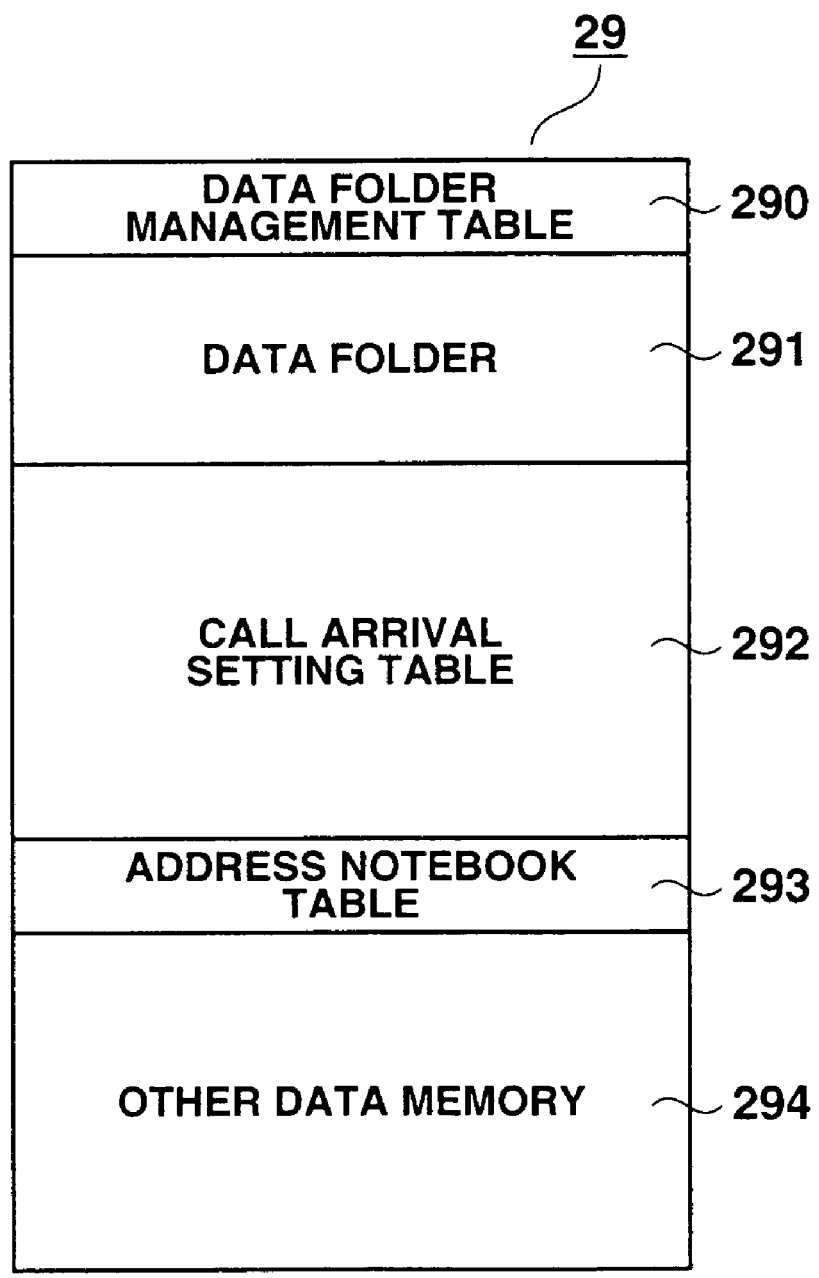
FIG. 3 is a schematic view showing an example of a configuration of a RAM memory area shown in FIG. 1.

FIG. 3 is a schematic view showing a memory area configuration of the RAM 29. The RAM 29 is segmented into an area of a data folder management table 290; an area of a data folder 291; an area of a call arrival setting table 292; an area of an address notebook table 293; and an area of other data memory 294.

A table configuration of the data folder management table 290 is as shown in FIG. 4. Actual real data is stored in the data folder 291. However, the data folder management table 290 managing them is provided so as to write a file name, a data size, a folder attribute, a folder title, a file attribute, and a copyright flag for each record number, and one record is formed of these elements.

The folder attribute is provided for sorting and managing items of data. On a display screen, data stored in a data folder is displayed for each folder. Any files are recorded miscellaneously in order of recording. The folder name indicates the name of folder displayed on the display screen.

The file attribute designates the attribute of data itself stored in the data folder. A motion picture indicates data (irrespective of the presence or absence of a sound) encoded/compressed in a file conforming to the AMC scheme compatible with the MPEG scheme and a motion picture file picked-up by the portable telephone 1. Even when no-sound is provided or only a sound is provided, when encoding is carried out in the MPEG scheme, the encoded data is handled as a same folder "movie." It is assumed that this attribute includes an animation file conforming to the GIF scheme (refer to record No. 15 of FIG. 4) or a file conforming to the PMD scheme (a sound-attachment animation file specialized for a format of the portable telephone (refer to record No. 14 of FIG. 4)).

The still picture includes a still picture file conforming to the JPEG (JPG) scheme, the BMP scheme, the PNG scheme, or GIF scheme or a still picture file picked-up by the portable telephone 1. The sound attribute includes an sound file recorded in the portable telephone 1 (refer to QCP format No. 003); a file conforming to the PMD format (a sound-attachment animation file specialized for the format of the portable telephone (when no animation is provided)) (refer to record Nos. 007 and 008 of FIG. 4); and a file conforming to the MMF scheme (a memory file specialized for the format of the portable telephone) (refer to record Nos. 009 to 010 of FIG. 4).

The call arrival setting table 292 is a table for setting what type of broadcast (screen display and sound (melody) output) is carried out when a call arrival request signal from the outside to an own telephone has been received. In detail, as shown in FIG. 5, record No. of the above-described data folder management table 290 is stored.

When a file attribute of data corresponding to the stored record No. is a motion picture, this file is opened upon the receipt of the call arrival request signal, and the corresponding motion picture is displayed at the display device 13. Then, when this motion picture file includes a sound, the corresponding sound is output. When no-sound is included, a defaulted broadcast buzzer is output.

When the file attribute of data corresponding to the stored record No. is a still picture, this file is opened upon the receipt of a call arrival request signal, and the corresponding still picture is displayed at the display device 13. Then, in the call arrival setting table 292, when record No. corresponding to this still picture file includes record No, of a file whose file attribute is "sound," the sound corresponding to that record No. is output. Otherwise, a defaulted broadcast buzzer is output.

Figure 5:
FIG. 5 is a schematic view showing an example of contents of a call arrival setting table shown in FIG. 3.

FIG. 5 is a view showing an example of contents of the call arrival setting table 292. A transmitter number flag in FIG. 5 includes the transmitter's telephone number in a call arrival request signal. When this telephone number is identical to that stored in the address notebook table 293, when the transmitter number flag is set, broadcasting is carried out based on that call arrival setting. A corresponding address denotes a storage address in the address notebook table 293 described above.

An operation according to the present embodiment will be described here. First, a general operation will be described in accordance with the flow charts of FIGS. 6 and 7.

Figure 6:
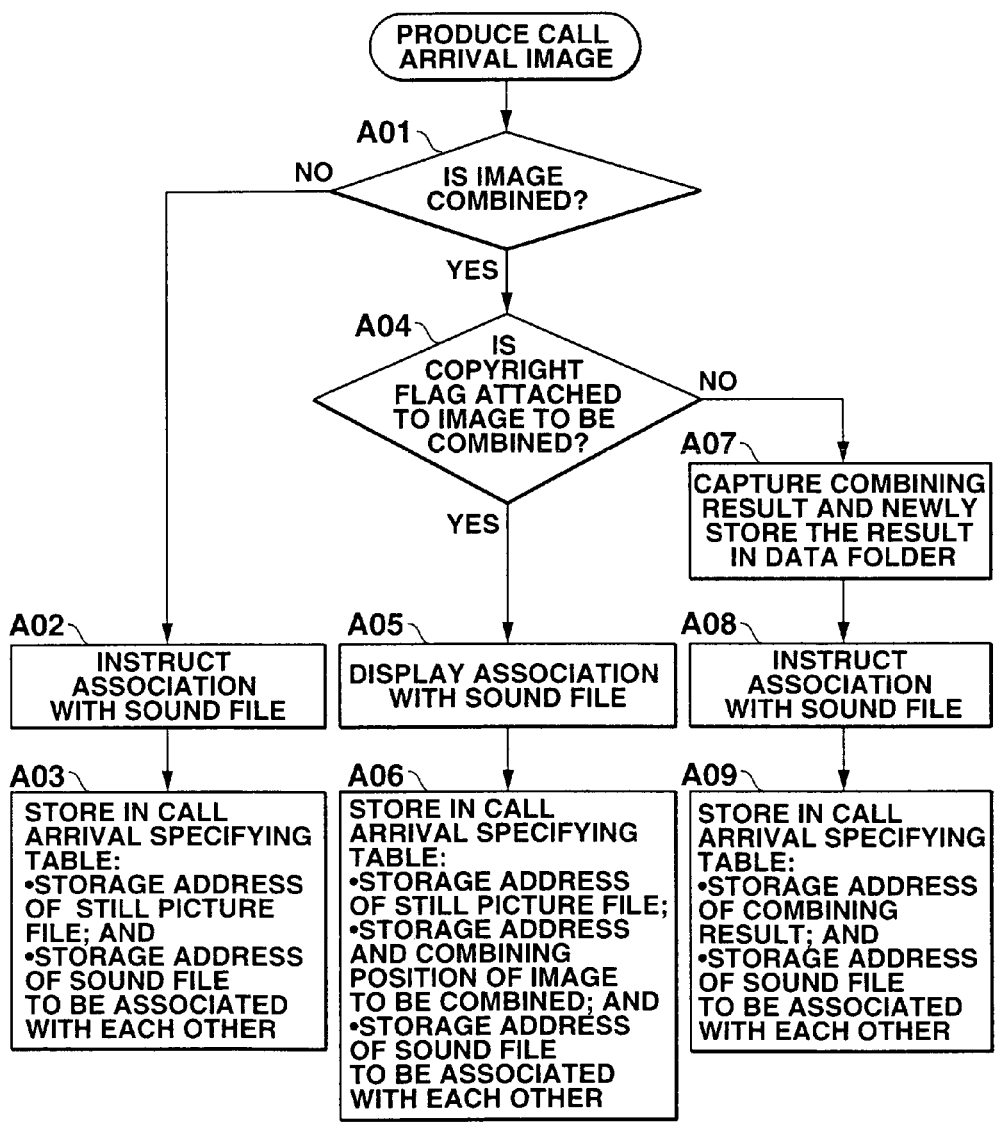
FIG. 6 is a flow chart showing general procedures for setting an image (a still picture or a motion picture) picked-up by the portable telephone shown in FIG. 1 on the call arrival setting table so as to be displayed upon call arrival.

In FIG. 6, the portable telephone 1 provides access to an image data download site over a communication network via the antenna 11, the wireless transmitter/receiver 20, and the wireless signal processor 21, downloads image data, and stores the downloaded image data in an image memory 23. In addition, the image file picked-up by the picking-up portion (object lens 18, image pickup module 181, DSP 182) and compressed/encoded by the image compression/encoding processor 23 is stored in the other data memory 294 (image memory) of the RAM 29.

When the user sets the image (still picture or motion picture) picked-up by the portable telephone 1 so as to be displayed upon call arrival, the controller 22 determines whether or not the downloaded image is combined with the picked-up image displayed upon call arrival in step A01 of FIG. 6. When the determination result is negative, association with a sound file played back at the same time when this picked-up image is displayed upon call arrival is instructed in step A02, and a storage address of a still picture file and a storage address of the sound file are stored in the call arrival setting table 292 so as to be associated with each other in step S03.

When the downloaded image is combined with the picked-up image, processing goes to step A04 in which it is determined whether or not a copyright is attached to the downloaded image to be combined. When the determination result is negative, processing goes to step A07, and when the determination result is affirmative, processing goes to step A05.

In step A05, association with the sound file played back at the same time when this picked-up image is displayed upon call arrival is instructed. In step A06, the storage address of the still picture file, the storage address and combining position of the image to be combined, and the storage address of the sound file are stored in the call arrival setting table 292 so as to be associated with each other.

When processing goes to step A07, the downloaded image is combined with the picked-up image, and the combining result is captured. Then, the captured result is stored in the new data folder 291 contained in the RAM 29. In step A08, association with the sound file played back at the same time when this combined image is displayed upon call arrival is instructed. In step A09, the storage address of the combining result and the storage address of the sound file are stored in the call arrival setting table 292 so as to be associated with each other.

In short, when the image (still picture or motion picture) picked-up by the portable telephone 1 is set on the call arrival setting table 292 so as to be displayed upon call arrival, when a copyright protection flag (illegal copy protection) is set to the image to be combined, record No. of the picked-up image and the corresponding record No. are stored to be associated with each other. When no copyright protection flag (illegal copy protection) is set, the combining result is captured. Then, a file is newly created, and record No. of that file is set on the call arrival setting table 292.

Figure 7:
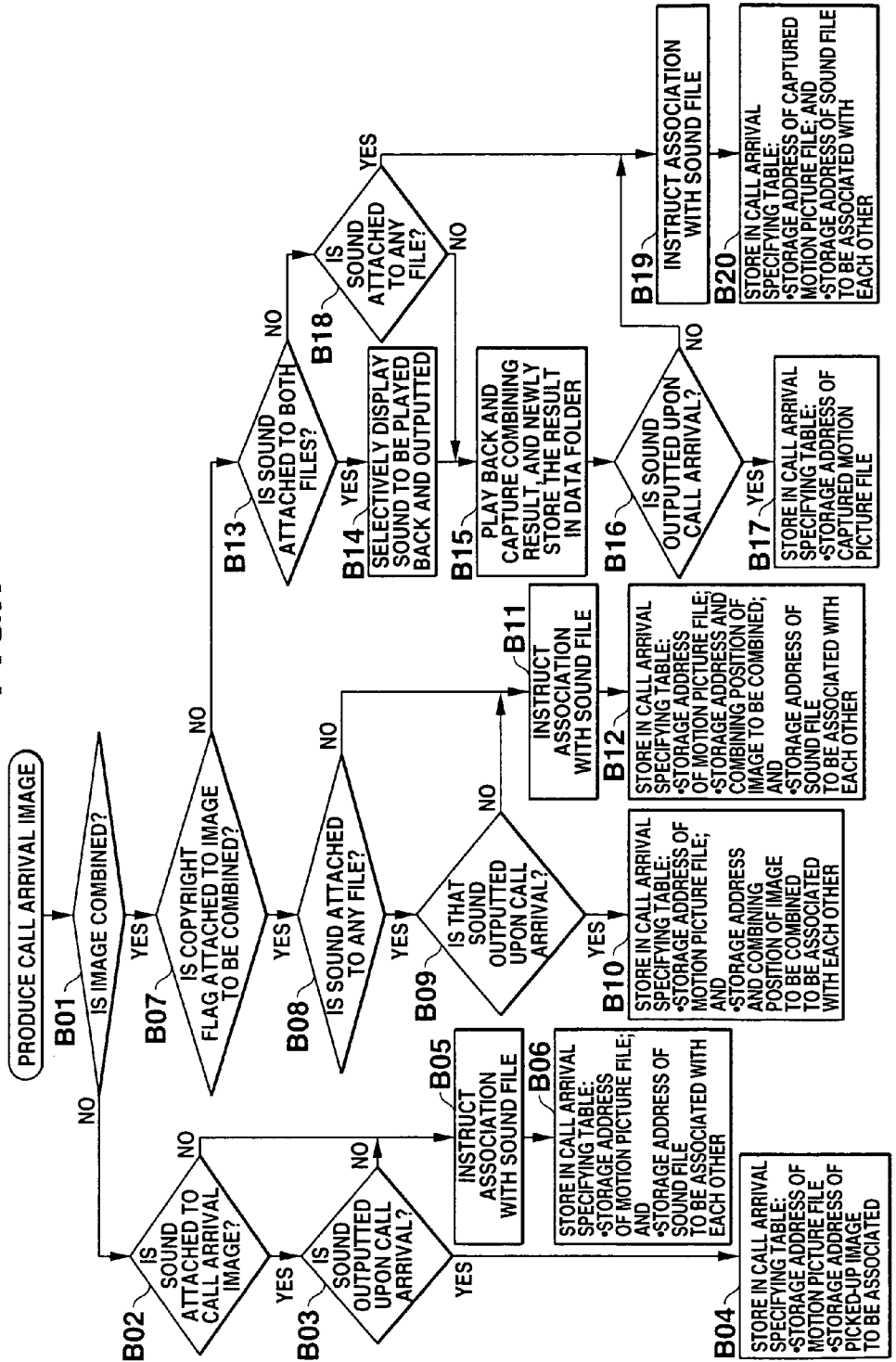
FIG. 7 is a flow chart showing more detailed procedures for setting an image (a still picture or a motion picture) picked-up by the portable telephone shown in FIG. 1 on the call arrival setting table so as to be displayed upon call arrival.

FIG. 7 is a flow chart showing more detailed operating procedures for setting the image (still picture or motion picture) picked-up by the portable telephone 1 so as to be displayed upon call arrival. In step B01, it is determined whether or not the downloaded image is combined with the picked-up image to be displayed upon call arrival. When the determination result is negative, it is determined in step B02 whether or not a sound is attached to the picked-up image to be displayed upon call arrival, i.e., a call arrival image. When the determination result is negative, processing goes to step B05, and when the determination result is affirmative, processing goes to step B03.

In step B03, it is determined whether or not the sound attached to the call arrival image is output upon call arrival. When the determination result is negative, processing goes to step B05, and when the determination result is affirmative, processing goes to step B04. In step B04, the storage address of the motion picture file is stored in the call arrival setting table 292 so as to be associated with the storage address of the picked-up image.

When processing goes to step B05, association of the sound output when the call arrival image is displayed with the sound file is instructed. In step B06, the storage address of the motion picture file and the storage address of the sound file are stored in the call arrival setting table 292 so as to be associated with each other.

When it is determined in step B01 that the downloaded image is combined with the picked-up image, processing goes to step B07 in which it is determined whether or not a copyright is attached to the downloaded image to be combined. When the determination result is negative, processing goes to step B13, and when the determination result is affirmative, processing goes to step B08. In step B08, it is determined whether or not a sound is attached to either of the picked-up image file and the downloaded image file. When the determination result is negative, processing goes to step B11, and when the determination result is affirmative, processing goes to step B09.

In step B09, it is determined whether or not the sound attached to any image is output upon call arrival. When the determination result is negative, processing goes to step B11, and when the determination result is affirmative, processing goes to step B10. In step B10, the storage address of the motion picture file and the storage address and combining position of the image to be combined are stored in the call arrival setting table 292 so as to be associated with each other.

When processing goes to step B11, association of the sound file is instructed, and the storage address of the motion picture file, the storage address and combining position of the image to be combined, and the storage address of the sound file are stored in the call arrival setting table 292 so as to be associated with each other.

When processing goes to step B13, it is determined whether or not a sound is attached to both of the picked-up image file and the downloaded image file. When the determination result is negative, processing goes to step B18, and when the determination result is affirmative, processing goes to step B14. In step B14, a sound to be played back upon call arrival is instructed to be selected. In step B15, the combining result is played back and captured, and the captured combining result is newly stored in the data folder 291.

In step B16, it is determined whether or not a sound is output upon call arrival. When the determination result is negative, processing goes to step B19, and when the determination result is affirmative, processing goes to step B17. In step B17, an address of the captured motion picture file (combined image) is stored in the call arrival setting table 292.

When processing goes to step B18, it is determined whether or not a sound is attached to either of the picked-up image file and the downloaded image file. When the determination result is affirmative, processing goes to step B15, and when the determination result is negative, processing goes to step B19. In step B19, association with the sound file is instructed. In step B20, the address of the captured motion picture file (combined image) and the storage address of the sound file are stored in the call arrival setting table 292 so as to be associated with each other.

FIGS. 8, 9, 10, 11, and 12 are flow charts showing procedures for picking-up an image by actually using a camera function of the portable telephone 1 and producing the image as a display image upon call arrival.

When the key input device 14 of the portable telephone 1 is operated to enter the camera mode, the controller 22 causes the display device 13 to display a menu in step S01. The user selects whether to pick up a motion picture or to pick up a still picture by operating the input device 14 with referring to this menu display. Thus, the controller 22 determines whether a functional mode selected in step S02 is a still picture or a motion picture. When the selected functional mode is a still picture, processing goes to step S03, and when the selected functional mode is a motion picture, processing goes to step S48 of FIG. 11.

Figure 23A:
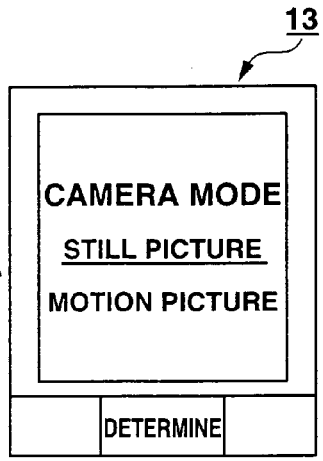
FIGS. 23A, 23B, 23C, 23D, and 23E are views each showing a screen example when an image is combined with a still picture displayed at a display device shown in FIG. 1.
Figure 24A:
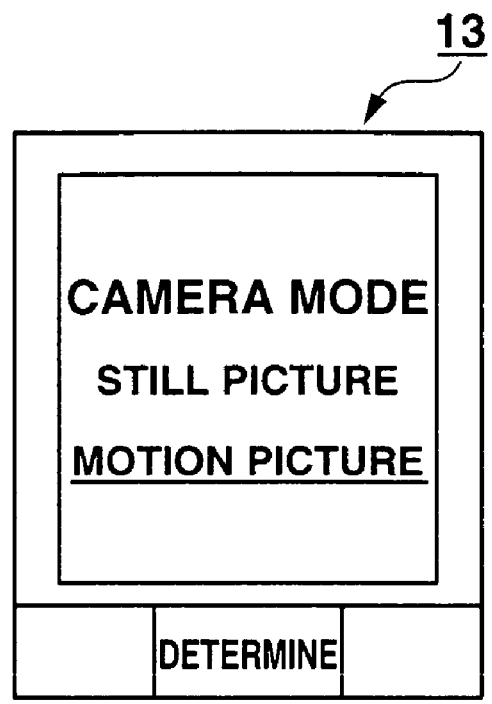
FIGS. 24A and 24B are views each showing a screen example when an image is combined with a motion picture displayed at the display device shown in FIG. 1.

FIG. 23A shows an example of screen displayed at the display device when the user has selected a still picture, wherein the "still picture" is underlined. FIG. 24A shows an example of screen when a motion picture has been selected, wherein the "motion picture" is underlined.

In step S03, an electrical signal obtained by picking-up an object by the image pickup module 181 is imaged by means of the DSP 182, and the resulting image is through-displayed intact at the main display device 13 through the driver 25. Then, in step S04, it is determined whether or not operation of the shutter key 143 is detected. When the determination result is negative, processing returns to step S03, and when the determination result is affirmative, processing goes to step S05 in which the image output from the DSP 182 is stored to be temporarily captured in the other data memory 294 of the RAM 29.

In step S06, after a file name input instruction has been displayed for the user at the display device 13, it is determined whether or not a file name input determination has been detected in step S07. When the determination result is affirmative, processing goes to step S09, and when the determination result is negative, processing goes to step S08 in which it is determined whether or not cancellation has been detected. When the determination result is negative, processing returns to step S06, and when the determination result is affirmative, processing returns to step S03.

Figure 23D:
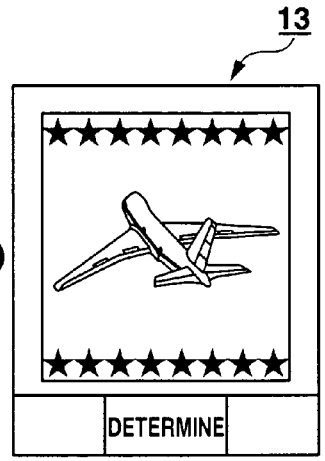
Figure 23B:

In step S09, a file attribute and/or a still picture, and folder attribute 002 (my photo) are attached to the captured still picture, and stored in the data folder 291. Then, in step S10, the display device 13 displays an image which causes the user to select whether or not this picked-up image is used for a call arrival image. FIG. 23B shows an example of display image when the user has selected that the image is used for the call arrival image, wherein "YES" is underlined.

Upon the receipt of the above operation, in step S11, it is determined whether or not the user has selected that the image is used for the call arrival image. When the determination result is negative, a file name (fuukei.jpg) is set in the picked-up still picture file. Then, the set file name is stored in the data folder 291 of the RAM 29 with record No. 20, and processing returns to the menu display. When the determination result is affirmative, processing goes to step S12.

When a user has selected that a picked-up image is produced as a call arrival image, the user selects whether or not a downloaded image is combined with this call arrival image. Upon the receipt of this user selection, the controller 22 determines whether or not the downloaded image is combined with the picked-up image displayed upon call arrival in step S12. As a result, when the determination result is negative, processing goes to step S24, and when the determination result is affirmative, processing goes to step S13 in which it is determined whether a still picture or a motion picture is to be combined. When the determination result is the still picture, processing goes to step S14, and when the determination result is the motion picture, processing goes to step S31 shown in FIG. 10.

Figure 23E:
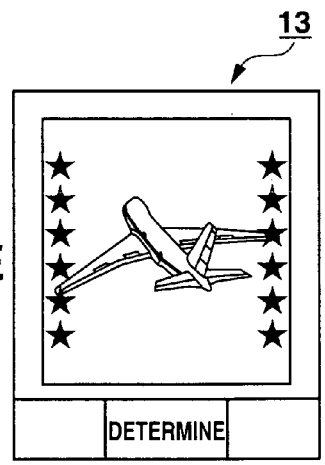
Figure 23C:
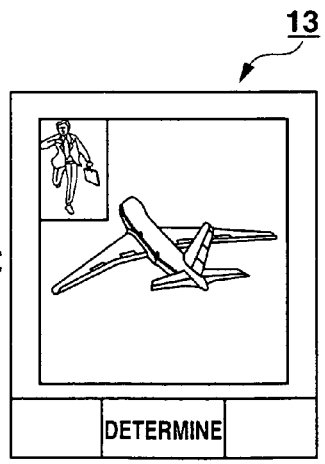

In step S14, the file attribute and/or still picture files which have/has already been downloaded over a network are displayed at the display device 13 for each folder. In step S15, the display device displays a combined image as shown in FIG. 23C, for example, according to the subsequent user selecting and/or combining operation.

Image combining are carried out until a determination of the completion of producing a combined image has been detected. When the completion of producing the combined image is determined, it is determined in step S17 whether or not a copyright flag is attached to the downloaded image used to be combined. When the determination result is negative, processing goes to step S21, and when the determination result is affirmative, processing goes to step S18.

In step S18, the display device 13 displays an indication for checking whether or not a valid copyright flag is attached to the downloaded image. In step S19, processing from step S14 to step S18 is repeated until YES has been detected for check. When YES is detected, processing goes to step S20 in which association data is stored in the call arrival setting table 292, and then, processing goes to step S24 shown in FIG. 9.

Figure 14:
FIG. 14 is a schematic view showing an example of contents of a call arrival setting table in step S20 shown in FIG. 8.

FIG. 14 shows an example of contents of the call arrival setting table 292 in step S20. The figure shows a case in which a still picture file of stamp02.png of record No. 17 has been combined with a still picture file of record No. 20.

A display example of this case will be described with reference to FIG. 23C. Even with such a combined image, the still picture of stamp02.png (still picture indicating a human being on the top left of the display screen in FIG. 23C) cannot be newly produced as a combined image because the copyright flag is set. Therefore, the storage contents of the call arrival setting table 292 are produced as record No. of picked-up image file+record No. of combined image file (combining position (upper left corner reference) X coordinate, combining position (upper left corner reference) y coordinate).

When processing goes to step S21, the combined still picture is played back once. In step S22, a file name of this combined image is input and determined. Then, record No. 21 is newly stored in the data folder 291 as shown in FIG. 15. Then, in step S23, a storage address of this combined image is stored in the call arrival setting table 292, as shown in FIG. 16, and processing goes to step S24.

An example of contents of the data folder 291 in FIG. 15 shows a case in which a captured image (chakufuukei.jpg) of the combining result has been newly stored when a copyright protection flag (illegal copy protection) is not set in the combined image file.

FIG. 16 shows an example of storage contents of the call arrival setting table 292 when a still picture file of stamp01.png of record No. 16 has been combined with a still picture file of record No. 20, for example, as the above-described combined image. An example of the display screen of the display device 13 will be described again with reference to FIG. 23C. The still picture of stamp01.png (still picture indicating a human being at the upper left of the display screen in FIG. 23C) is newly produced as a combined image because the copyright flag is not set. Therefore, the storage contents of the call arrival setting table 292 are produced as record No. of the newly produced image file.

In step S24, when a sound is added to a call arrival image, the file attribute and/or sound which have/has been already downloaded over a network, or a file attribute animation (excluding no-sound) file are displayed for each folder. Then, the fact that the user has selected this file is displayed until the selection has been detected in step S25. Thereafter, when the user selection is detected, association data as shown in FIG. 17 is stored in the call arrival setting table 292 in step S26. Then, processing returns to the menu display screen.

An example of FIG. 17, for example, shows storage contents of the call arrival setting table 292 when the still picture file of stamp02.png of record No. 17 is combined with the still picture file of record No. 20, and record No. 08 is stored as a sound file to be output upon call arrival. The storage contents of the call arrival setting table 292 are produced as record No. of picked-up image file+record No. of combined image file (combining position (upper left corner reference) X coordinate, combining position (upper left corner reference) y coordinate)+record No. of associated sound file.

In step S25 in which "No" is detected, an example of contents of the call arrival setting table 292 in step S26 is as shown in FIG. 18. In FIG. 18, there is shown an example of storage contents of the call arrival setting table 292 when record No. 08 is stored in record No. 21 (in a newly produce combined image file) as a sound file to be output upon call arrival. The storage contents of the call arrival setting table 292 are produced as record No. of newly produced image file+record No. of associated sound file.

Figure 10:
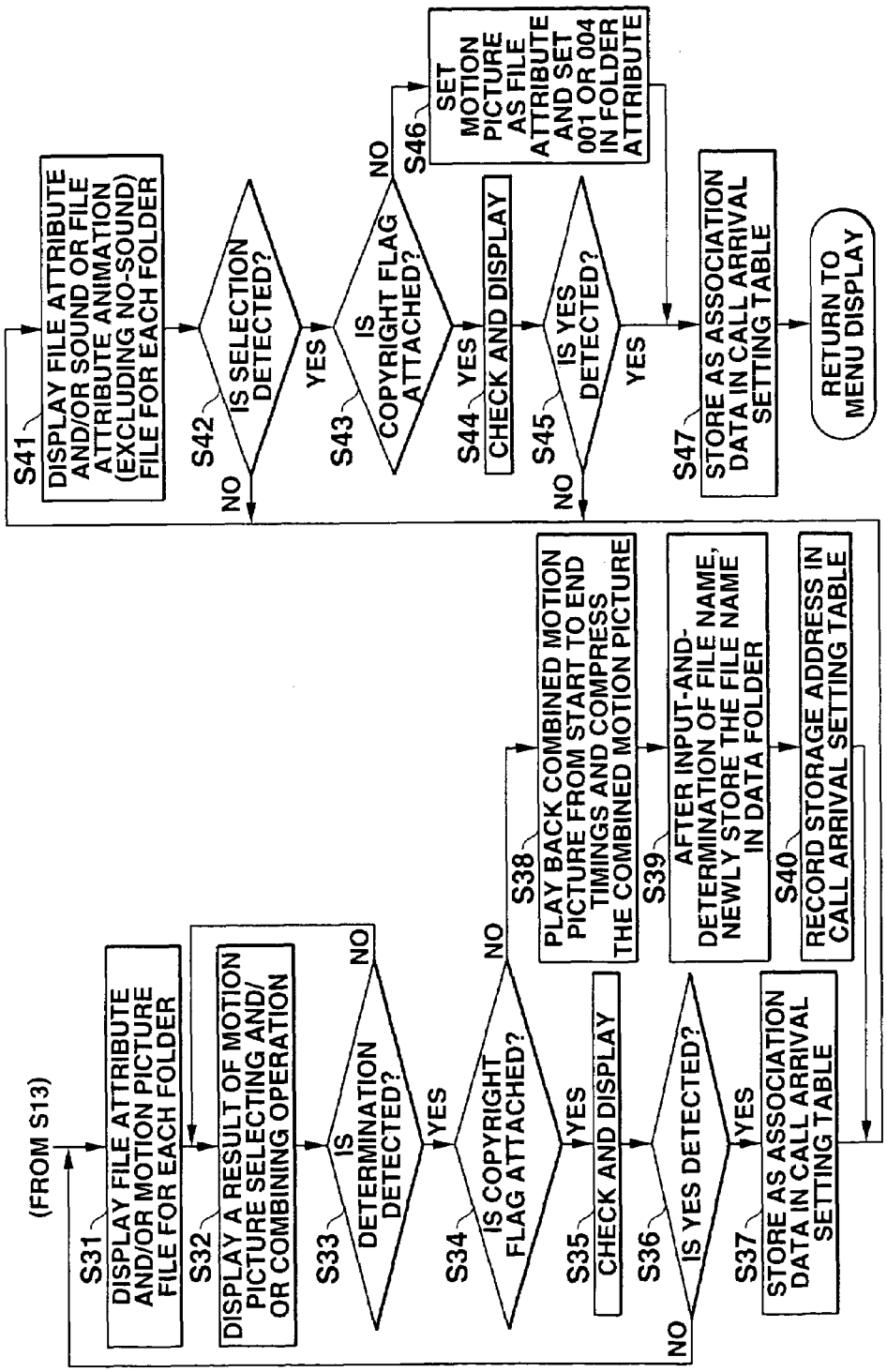
FIG. 10 is a flow chart showing procedures for picking-up an image by actually using a camera function of the portable telephone shown in FIG. 1, and producing the resulting image as a display image upon call arrival.

When processing goes to step S31 shown in FIG. 10, the display device 13 displays files whose downloaded file attribute is a motion picture for each folder. In step S32, the display device 13 displays a combined image according to the subsequent user selecting and/or combining operation.

FIG. 19 shows a storage example of a combined image when a motion picture has been produced to be combined with a still picture in step S32. The figure shows a state in which the image file (chakufuukei.gif) produced when the file attribute motion picture (movieframe 01 gif) shown in FIG. 13 is combined is captured, and is stored as record No. 021 in the data folder 291 of the RAM 29.

That is, even when the picked-up image is a still picture, when a motion picture (animation) is targeted to be combined, the combining result is newly produced as a motion picture in a file. A description will be given by way of example with reference to FIGS. 23D and 23E. Data for which columns star-marked are changed alternately in FIGS. 23D and 23E is produced as a file called movieframe01.gif of record No. 18 in FIG. 19.

Namely, even when the picked-up image is a still picture (an airplane icon in the figure), when the combined image includes a motion picture (columns star-marked in the figures), a motion picture file is produced in accordance with that file format. At this time, a folder attribute, a file attribute and the like are not set. In step S46 described later, when a sound file (without a copyright) is associated, a sound-attachment animation file (chakufuukei.pmd) is processed as a file. Then, the processed file is stored in the data folder 291, as shown in FIG. 20.

Image combining is carried out until a determination of the completion of producing a combined image has been detected. When the completion of producing the combined image is determined, it is determined whether or not the copyright flag is attached to the downloaded image used to be combined in step S34. When the determination result is negative, processing goes to step S38, and when the determination result is affirmative, processing goes to step S35.

In step S35, the display device 13 displays an indication for checking whether or not a valid copyright flag is attached to the downloaded image. In step S36, processing from step S31 to step S35 is repeated until affirmative answer YES has been detected. When YES is detected, processing goes to step S37 in which association data is stored in the call arrival setting table 292, and then, processing goes to step S41.

When processing goes to step S38, the combined motion picture is played back from start to end timings and is compressed by means of the image compression/encoding processor 23. Then, in step S39, a file name of this combined image is input and determined. Then, in step S40, the file name is newly stored in the data folder 291, and processing goes to step S41.

In step S41, when a sound is added to a call arrival image, the display device 13 displays a file attribute and/or a sound which have/has been already downloaded over a network, or a file attribute animation (excluding no-sound) file for each folder. Then, the display is continued until it is detected in step S42 that the user has selected the file. When the user selection is detected, it is determined in step S43 whether or not the copyright flag is attached to the downloaded image used to be combined. When the determination result is negative, processing goes to step S46, and when the determination result is affirmative, processing goes to step S44.

In step S44, the display device 13 displays an indication for checking whether or not a valid copyright flag is attached to the downloaded image. In step S45, processing from step S41 to step S44 is repeated until affirmative answer YES has been detected. When YES is selected, processing goes to step S47 in which association data is stored in the call arrival setting table 292, and then, processing returns to the menu display screen.

When no copyright flag is attached to the downloaded image, processing goes to step S46 in which a motion picture is set as a file attribute, and 001 or 004 is set in a folder attribute. Thereafter, processing goes to step S47 in which association data is stored in the call arrival setting table 292, and then, processing returns to the menu display screen.

Figure 8:
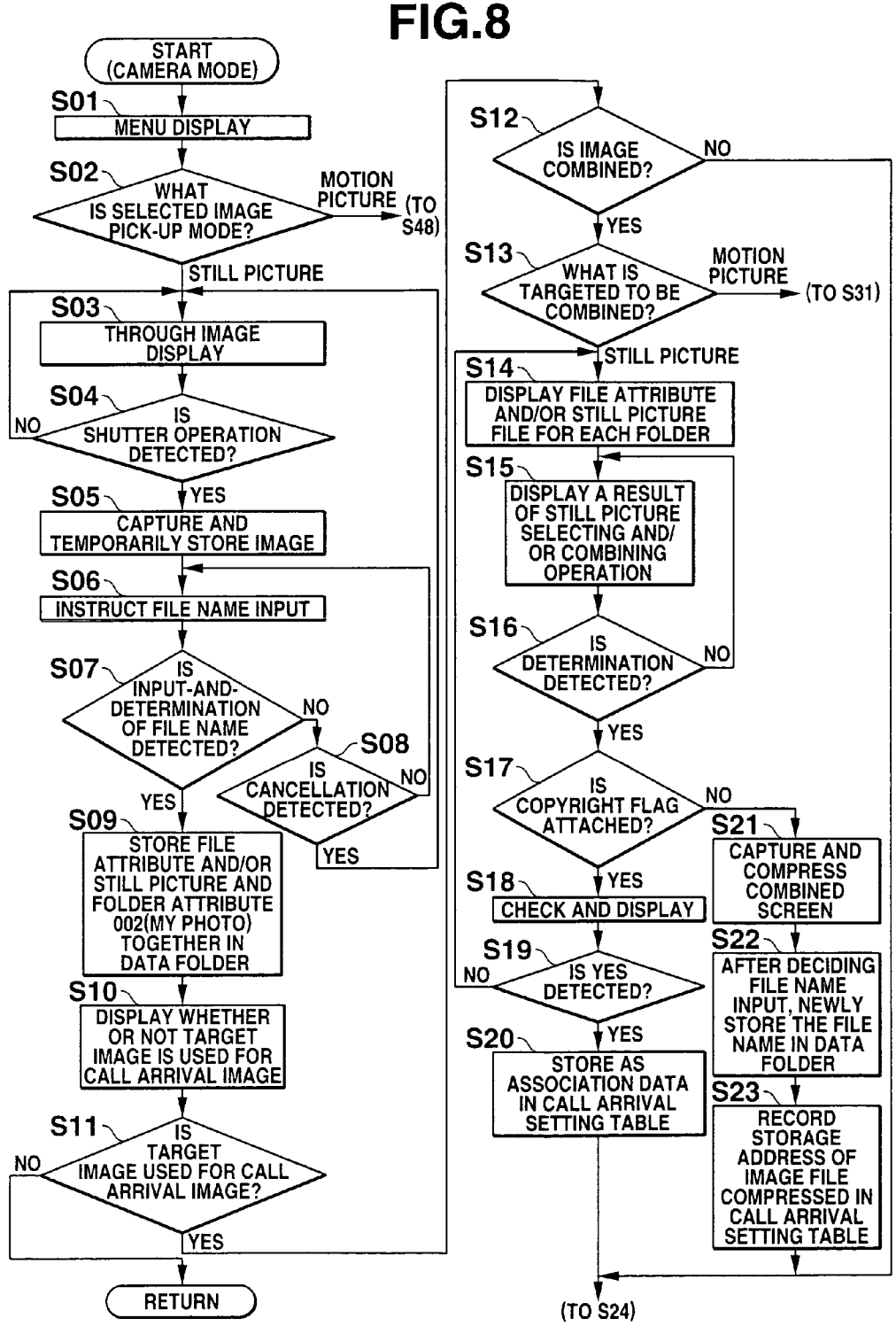
FIG. 8 is a flow chart showing procedures for picking-up an image by actually using a camera function of the portable telephone shown in FIG. 1, and producing the resulting image as a display image upon call arrival.
Figure 9:
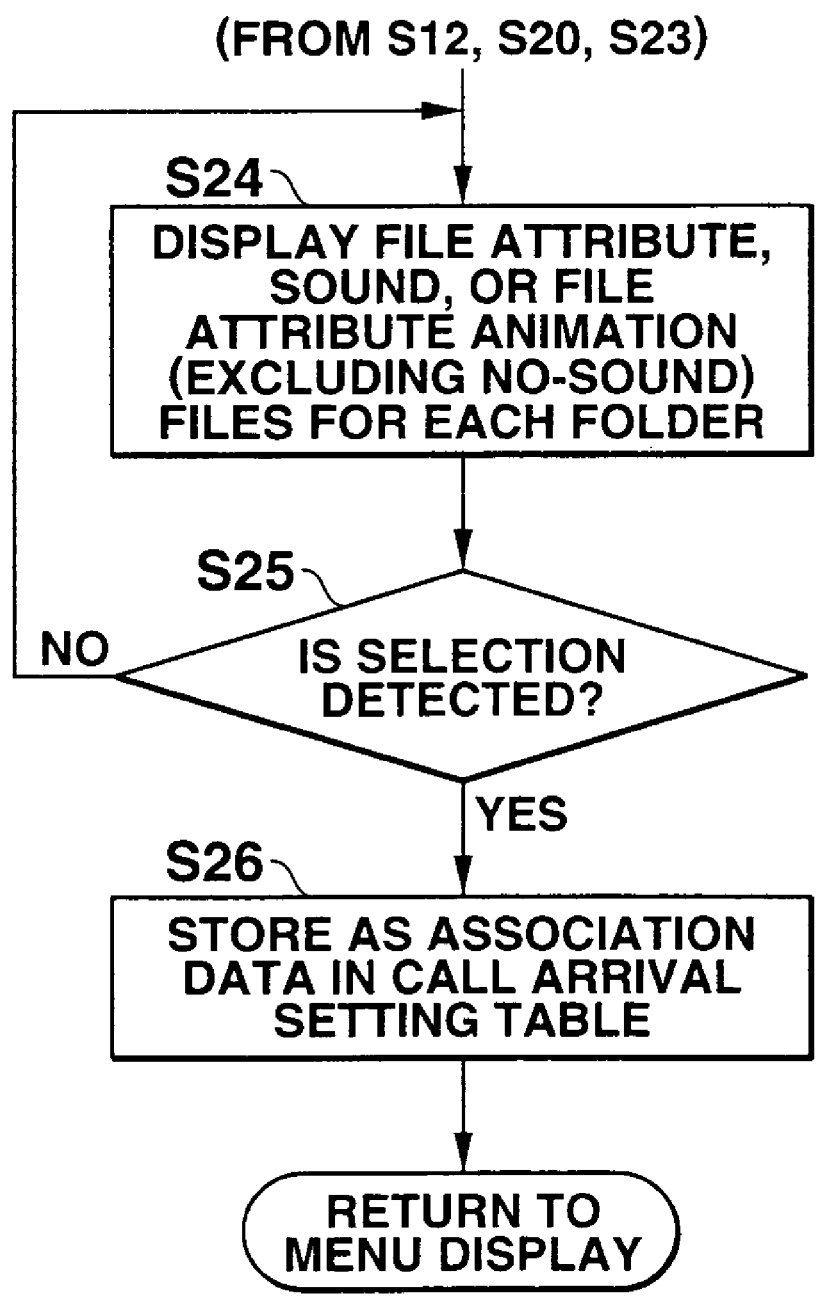
FIG. 9 is a flow chart showing procedures for picking-up an image by actually using a camera function of the portable telephone shown in FIG. 1, and producing the resulting image as a display image upon call arrival.
Figure 11:
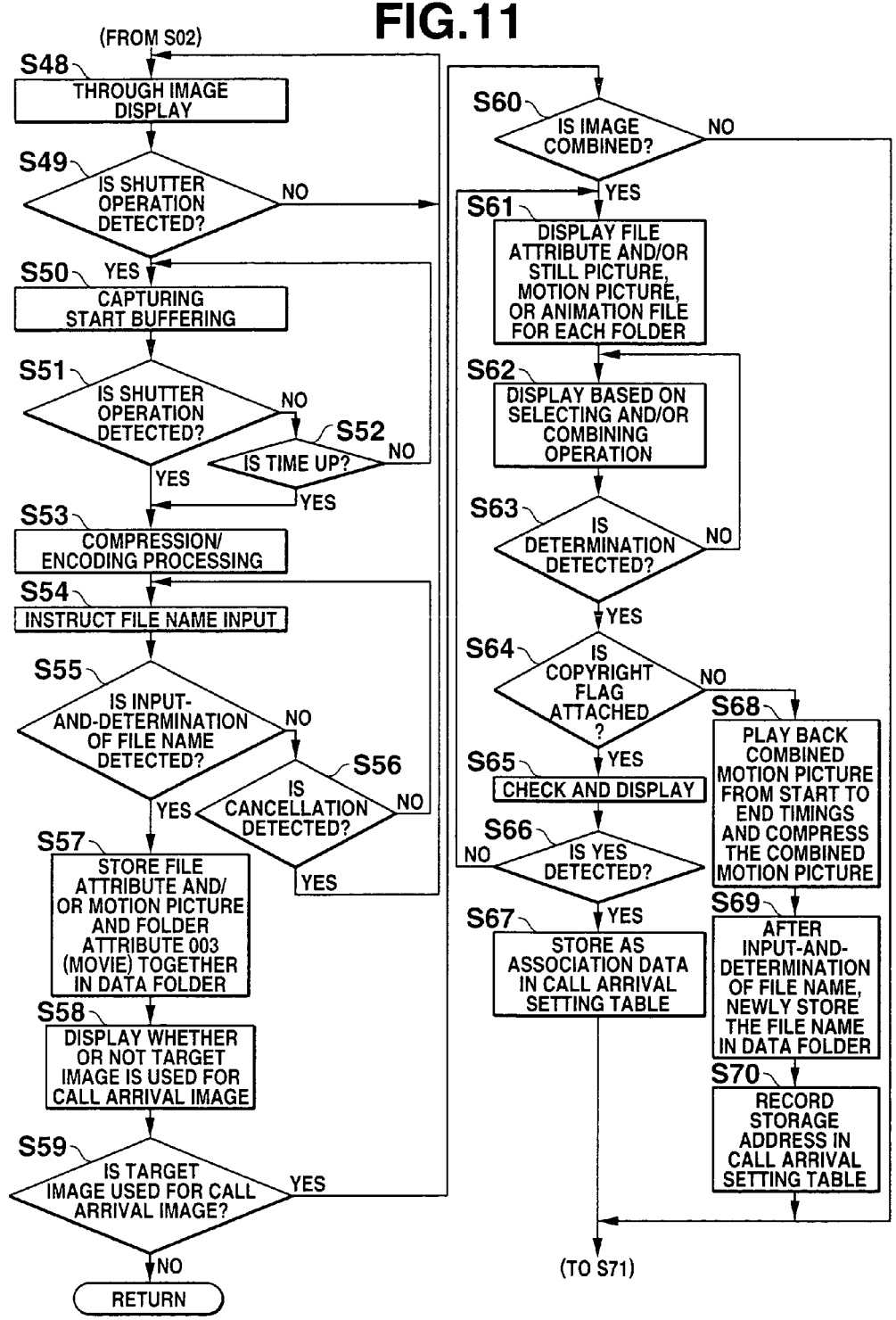
FIG. 11 is a flow chart showing procedures for picking-up an image by actually using a camera function of the portable telephone shown in FIG. 1, and producing the resulting image as a display image upon call arrival.

When the image pick-up mode selected in step S02 of FIG. 8 is a motion picture, processing goes to step S48 of FIG. 11 in which an electrical signal obtained by picking-up an object by the image pickup module 181 is imaged by means of the DSP 182, and the resulting image is through-displayed intact at the display device 13 through the driver 25. Then, in step S49, it is determined whether or not operation of the shutter key 143 is detected. When the determination result is negative, processing returns to step S48, and when the determination result is affirmative, processing goes to step S50 in which the motion picture output from the DSP 182 is stored to be temporarily captured in the other data memory 294 of the RAM 29.

In step S51, it is determined whether or not operation of the shutter key 143 is detected. When the determination result is negative, it is determined whether or not a predetermined time interval has elapsed in step S52. When the determination result is negative, processing returns to step S50, and when the determination result is affirmative, processing goes to step S53. When operation of the shutter key 143 is detected, processing goes to step S53 immediately.

When operation of the shutter key 143 is detected in step S51, processing goes to step S53 in which the temporarily captured image is compressed/encoded by means of the image compression/encoding processor 23. Then, in step S54, the display device 13 displays a file name input instruction for the user.

In step S55, it is determined whether or not a determination of file name input has been detected. When the determination result is negative, processing goes to step S56 in which it is determined whether or not cancellation has been detected. When no cancellation has been detected, processing returns to step S54, and when cancellation has been detected, processing returns to step S48.

When a determination of file name input has been detected in step S55, processing goes to step S57 in which the compressed/encoded motion picture is stored as shown in FIG. 21 in the data folder 291 of the RAM 29 by attaching the file attribute and/or motion picture or folder attribute 003 (movie) to the motion picture.

FIG. 21 shows an example in which, after a motion picture has been picked-up in the camera mode, when a motion picture file is produced, a file name (car.amc) is set for that motion picture file, and the set file name is stored as record No. 20 in the data folder 291.

In step S58, the display device 13 displays an image which causes the user to select whether this picked-up image is used for a call arrival image. In response to this, in step S59, it is determined whether or not the user has selected that the picked-up image is used for the call arrival image. When the determination result is negative, processing returns to the display menu, and when the determination result is affirmative, processing goes to step S60.

Figure 24B:
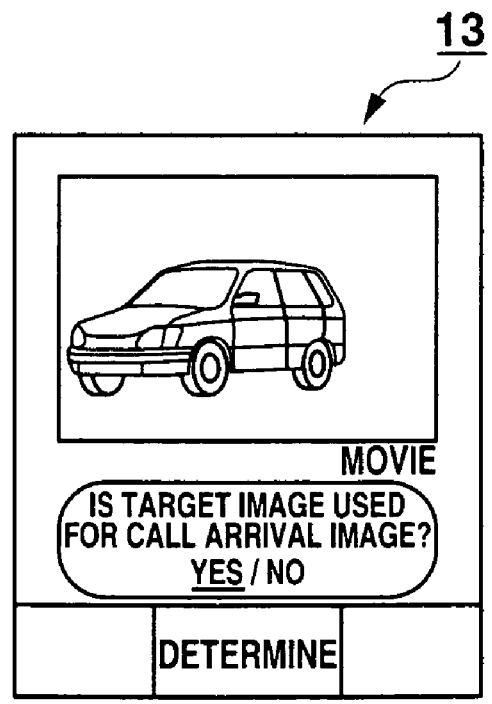

FIG. 24B shows an example of screen of the display device 13 when the user has selected that the picked-up image is used for the call arrival image, wherein "YES" is underlined. In addition, at this time, when the user has selected that the picked-up image is produced as the call arrival image, the user selects whether or not the selected image is combined with a downloaded image.

The controller 22 determines whether or not the downloaded image is combined with a picked-up image to be displayed upon call arrival. When the determination result is negative, processing goes to step S71 shown in FIG. 12. When the determination result is affirmative, processing goes to step S61 in which the display device 13 displays the file attribute, still picture, motion picture, or animation file which has already been downloaded over a network for each folder. In step S62, the display device 13 displays a combined image according to the subsequent user selecting and/or combining operation.

In step S63, processing of step S62 is repeated until a determination of a combined image has been selected. When the combined image is determined, it is determined in step S64 whether or not a copyright flag is attached to the downloaded image used to be combined. When the determination result is negative, processing goes to step S68, and when the determination result is affirmative, processing goes to step S65.

In step S65, the display device 13 displays an indication for checking whether a valid copyright flag is attached to the downloaded image. In step S66, processing from step S61 to step S66 is repeated until affirmative answer YES has been detected. When YES is detected, processing goes to step S67 in which association data is stored in the call arrival setting table 292, and then, processing goes to step S71 of FIG. 12.

When processing goes to step S68, the combined still picture is played back from start to end timings and is compressed by means of the image compression/encoding processor 23. In step S69, a file name of this combined image is input and determined, and then, the determined image is newly stored as shown in FIG. 22 in the data folder 291 of the RAM 29. Further, in step S70, this storage address is stored in the call arrival setting table 292, and then, processing goes to step S71 of FIG. 12

FIG. 22 is a view showing an example in which, when a copyright protection flag (illegal copy protection) is not set for an image file having a motion picture combined with a still picture therein, a captured image (chakucar.amc) of the combining result is newly stored in the data folder 291.

Figure 25A:
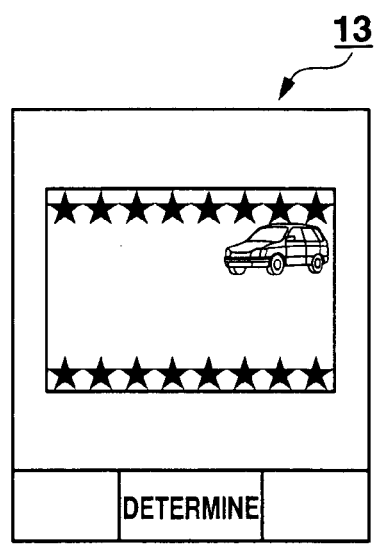
FIGS. 25A, 25B, and 25C are views each showing a screen example displayed at the display device shown in FIG. 1 when a motion picture has been combined with another motion picture.
Figure 25B:
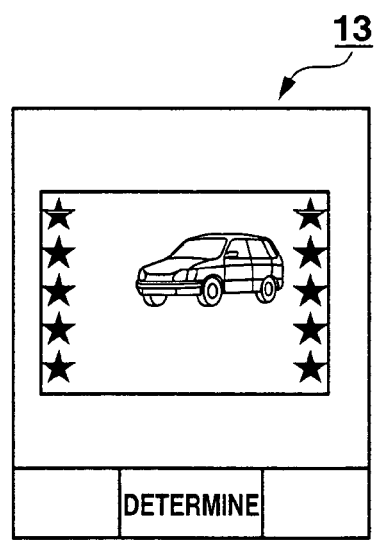
Figure 25C:
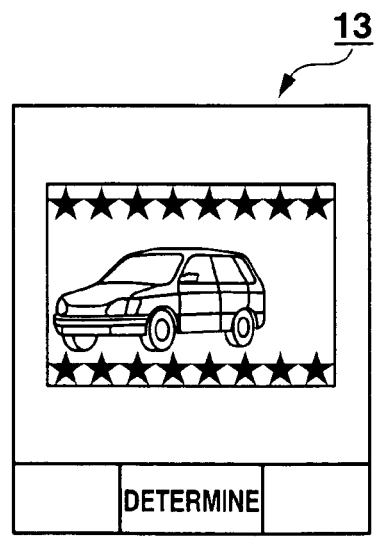

FIGS. 25A, 25B, and 25C each show an example of screen on which a motion picture is combined with a still picture. In FIGS. 25A, 25B, and 25C, data for which star-marked columns are changed alternately is produced as a file called movieframe01.gif of record No. 18 in FIG. 22. In this case, a motion picture file is produced in accordance with the file format of a picked-up image.

Figure 12:
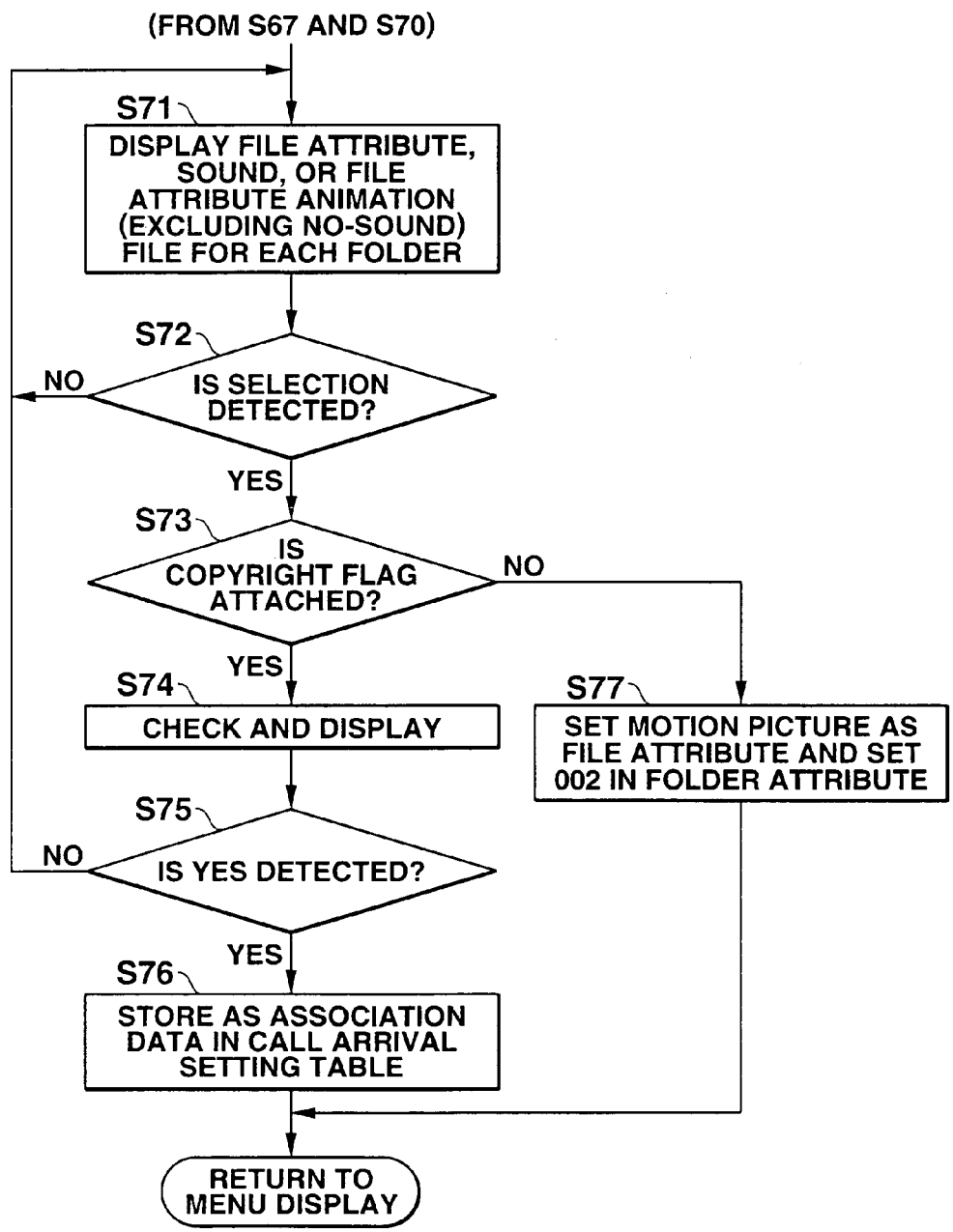
FIG. 12 is a flow chart showing procedures for picking-up an image by actually using a camera function of the portable telephone shown in FIG. 1, and producing the resulting image as a display image upon call arrival.

In step S71 of FIG. 12, when a sound is added to a call arrival image, the file attribute and/or sound which have/has downloaded over a network, or a file attribute animation (excluding no-sound) file is displayed for each folder. Then, the display continues until the user selection has been detected in step S72.

When the user selection is detected, it is determined whether or not the copyright flag is attached to the downloaded image used to be combined in step S73. When the determination result is negative, processing goes to step S77, and when the determination result is affirmative, processing goes to step S74.

In step S74, the display device 13 displays an indication for checking whether or not a valid copyright flag is attached to the downloaded image. In step S75, processing from step S71 to step S74 is repeated until affirmative answer YES has been detected. When YES is detected, processing goes to step S76 in which association data is stored in the call arrival setting table 292, and then, processing goes to the menu display screen.

When no copyright flag is attached to the downloaded image at step S73, processing goes to step S77 in which a motion picture is set as a file attribute; 001 or 004 is set as a folder attribute; association data is stored in the call arrival setting table 292; and then, processing returns to the menu display screen.

When the user uses an image which has been combined and stored once (for example, when the user transmits the image via E-mail), the controller 22 makes a search for the RAM 29. When the image to be used is stored as association data in the call arrival setting table 292, it is determined that a copyright is attached to a portion of the combined image. Then, the display device 13 displays an indication that "the image to be used cannot be displayed because a portion of the combined image has a copyright." In addition, when the combined image is used for transmission via E-mail, the display device displays an indication that "the image cannot be displayed and transmitted because a portion of the combined image has a copyright."

FIG. 26 is a flow chart showing procedures of the controller 22 when the above described combined image is used.

In step D01, when a combined image is called, processing goes to step D02 in which a search is made for the call arrival setting table 292 of the RAM 29. Then, it is determined whether or not the storage addresses of picked-up image and downloaded image configuring a combined image targeted for the call request are stored differently to be associated with each other.

In step D03, based on the above described search, it is determined whether or not the storage addresses of the picked-up image and downloaded image are different from each other. When the determination result is negative, processing goes to step DOS in which the combined image data is read out from the data folder 291 of the RAM 29 which is a storage destination, and the readout data is displayed.

When the storage addresses of the picked-up image and downloaded image are different from each other, processing goes to step D04 in which the display device 13 displays a message that "the image cannot be displayed because a portion of the combined image has a copyright," and terminates processing.

According to the present embodiment, when the user uses a combined image which has been combined and stored once, when a portion of the combined image has a copyright, the display device displays an indication that "the image cannot be displayed because a portion of the combined image has a copyright." In addition, when the combined image is used for transmission via E-mail, the display device further displays an additional indication that "transmission is impossible." Thus, the user can know immediately why the image is not displayed and why transmission via E-mail is impossible. Therefore, operability of the portable telephone 1 can be improved.

Now, other embodiments of the present invention will be described here. In the following embodiments, like constituent elements corresponding to the first embodiment are designated by the same reference numerals. A detailed description is omitted here.

Figure 27:
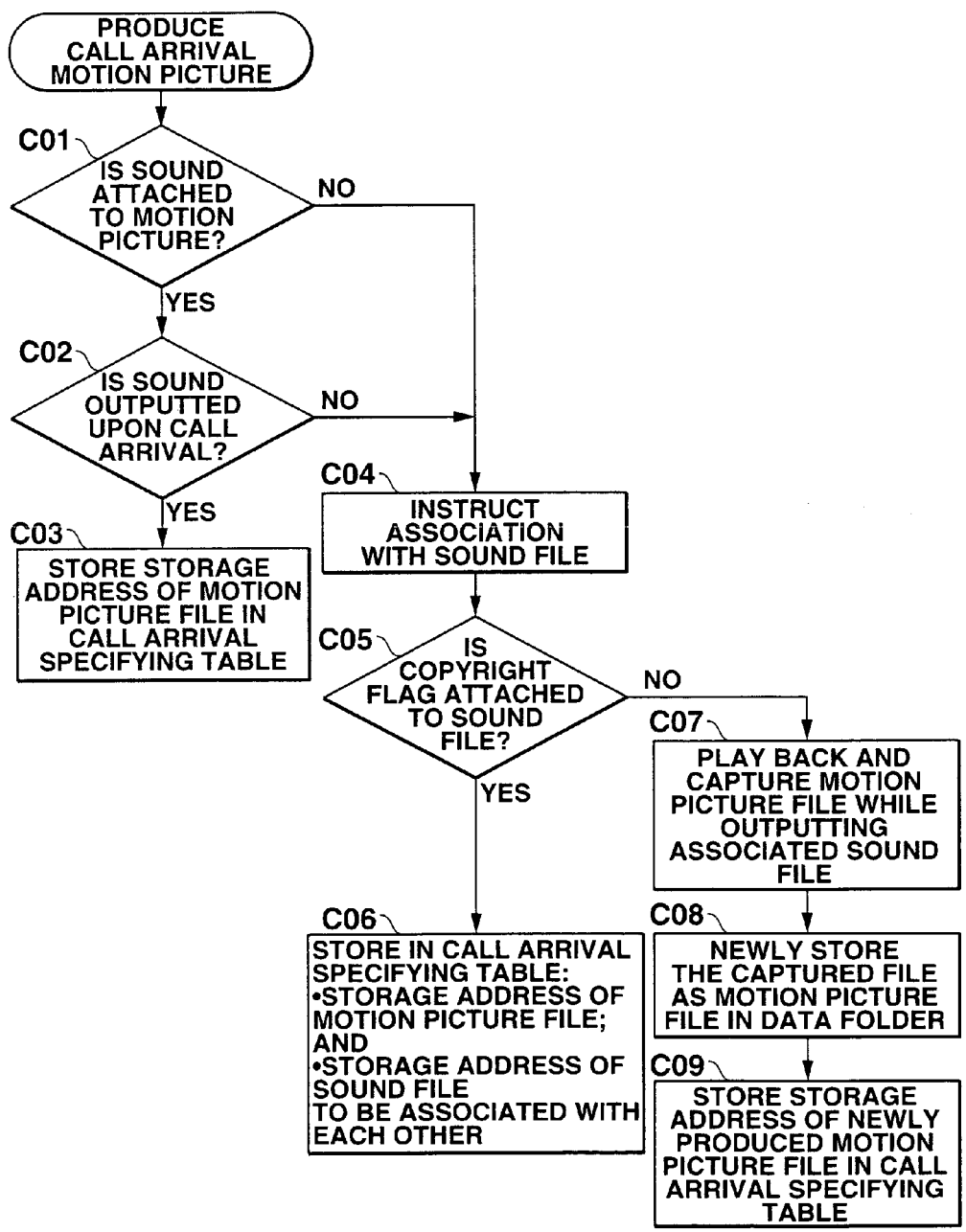
FIG. 27 is a flow chart showing processing for producing a sound to be output together with a call arrival image when a motion picture has been changed to a call arrival image by a portable telephone according to a second embodiment of the present invention.

FIG. 27 is a flow chart showing processing for generating a sound to be output together with a call arrival image when a motion picture according to a second embodiment of the present invention is produced as a call arrival image. Hereinafter, with respect to each element having an identical configuration, a description of the configuration and operation thereof is omitted. A main portion of that operation will be described here.

In step C01, it is determined whether or not a sound is attached to a motion picture to be combined. When the determination result is affirmative, processing goes to step C02, and when the determination result is negative, processing goes to step C04. In the former case, in step C02, it is determined whether or nor a sound is output upon call arrival. When no-sound is output upon call arrival, processing goes to step C04. When a sound is output upon call arrival, processing goes to step S03 in which a storage address of a motion picture file is stored in the call arrival setting table 292 of the RAM 29.

When processing goes to step C04, association with a sound file is instructed here. In step C05, it is determined whether or not a copyright flag is attached to this sound file. When the determination result is affirmative, the storage address of the motion picture file and the storage address of the sound file are stored in the call arrival setting table 292 so as to be associated with each other.

When no copyright flag is attached to the sound file, processing goes to step C07 in which a motion picture file is played back and captured while the associated sound file is output. In step C08, a motion picture file is newly stored in the data folder 292. In step C09, the storage address of the newly produced motion picture file is stored in the call arrival setting table 292.

When the user outputs a sound when a call arrival motion picture is displayed, i.e., when a sound is output when a combined image is displayed, and a copyright flag is attached to that image, the motion picture file and sound file are stored respectively. The respective storage addresses are stored as association data in the call arrival setting table 292. Thus, when these addresses are detected, it is determined that a sound output together with the combined image has a copyright.

According to the present embodiment, when a combined image with a sound output is transmitted via E-mail and the sound has a copyright, the display device displays an indication that "no transmission is possible because a sound has a copyright." In this manner, the user can know immediately why transmission is impossible, and operation of the portable telephone 1 can be improved.

In the above-described first embodiment and second embodiment, it is determined whether capturing and storage of the combined image enabled or disabled according to whether or not a file (multimedia data) which is a combining source has a copyright. The determination as to whether combining is enabled or disabled may be made on the presumption that "copyright protection is applied to file data downloaded over the Internet in principle."

Figure 28:
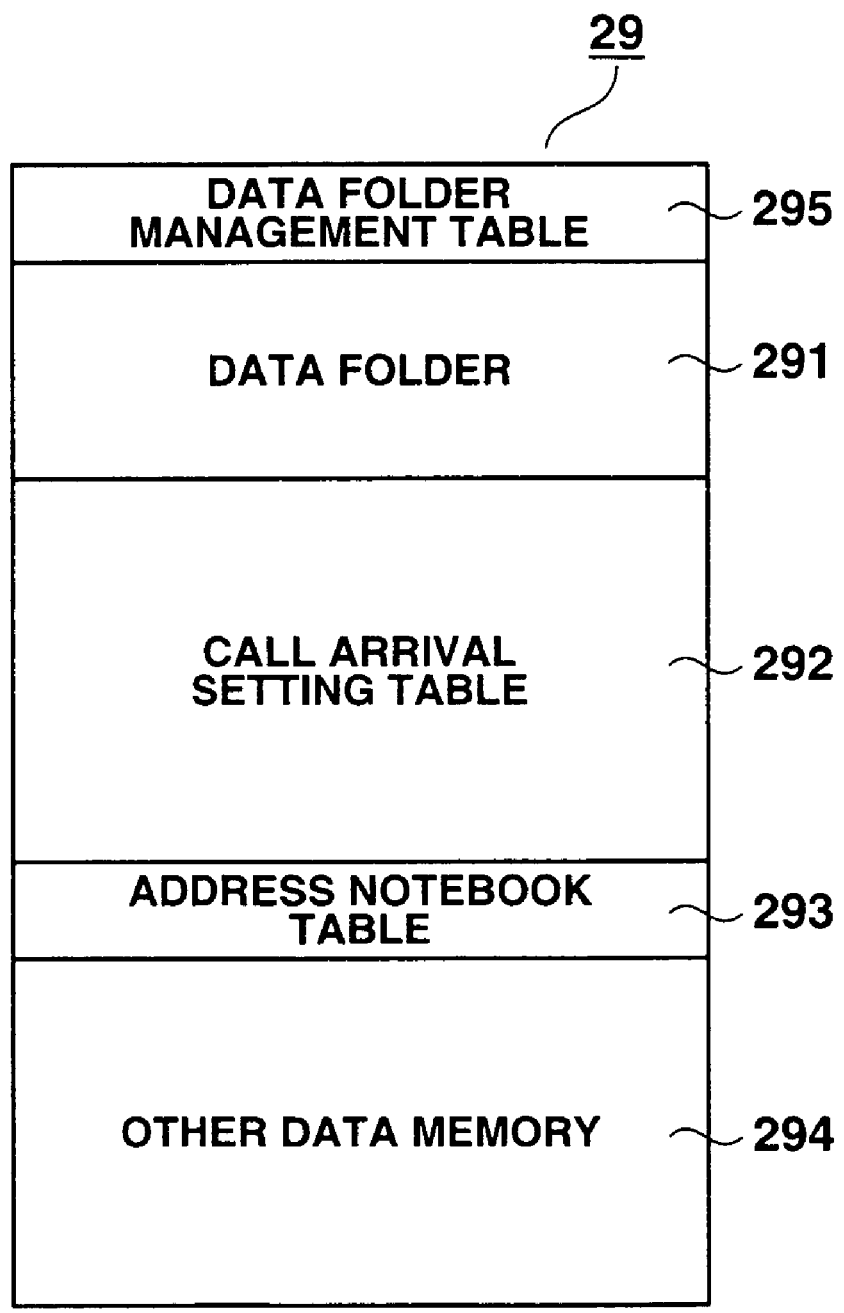
FIG. 28 is a schematic view showing an example of a configuration of a RAM memory area in another embodiment.

FIG. 28 is a schematic view showing a memory area configuration of the RAM 29 in the portable telephone 1 which is made compatible with the above-described case. A difference from the above first embodiment and second embodiment is that a data folder management table 295 is provided instead of the data folder management table 290. The other circuit configuration and memory configuration are identical to those in the above described first and second embodiments.

A table configuration of the data folder management table 295 is as shown in FIG. 29. Actual real data is stored in the data folder 291. The data folder management table 290 managing them is provided to write a file name, a data size, a folder attribute, a folder title, and a file attribute on a record No. by record No. basis, and one record is formed of these elements.

A region of the folder title is set so as to sort a downloaded item and a produced one in the portable telephone 1 when multimedia files are stored to be mixed. That is, in the folder title, a folder called "my ... " stores a variety of data obtained by operating the portable telephone 1 such as startup of a camera function. On the other hand, a folder which is not called "my ... " is stored in a folder for storing downloaded data.

In the course of combining processing, when data (file) being a combining source is read out from a folder in which "my ... " is not set, the corresponding storage addresses are stored respectively without capturing a forcibly composed image.

By doing this, the determination as to whether combining is enabled or disabled can be made irrespective of the presence or absence of copyright information.

Apart from determination as to whether combining is enabled or disabled on the presumption that "copyright protection is applied, in principle, to file data downloaded over the Internet, for example," even in a still picture file conforming to the JPEG scheme, the still picture file being picked-up by the portable telephone 1, the determination as to whether combining is enabled or disabled may be made on the presumption that "all files may be processed as long as they are in a file format conforming to the DFC standard or Exif standard."

FIG. 30 shows a table configuration of the data folder management table 295 of the RAM 29 in the portable telephone 1 which is made compatible with the above described case. Actual real data is stored in the data folder 291. The data folder management table 290 managing them is provided so as to write a file name, a data size, a folder attribute, a folder title, and, a file attribute in a DCF/Exif flag area on a record No. by record No. basis. One record is formed of these elements.

The DCF/Exif flag area is provided as a flag set for sorting the downloaded item and the item produced in the portable telephone 1 according to whether they are produced in accordance with the DCF standard or Exif standard in storing a still picture file conforming to the JPEG scheme. That is, in FIG. 30, a file name "taro.jpg" managed in record No. 002 is picked-up by the portable telephone 1, and is stored in a folder whose folder title is "my photo." Therefore, this file is found to be a still picture file stored after picked-up, and thus, "1" is set in the DCF/Exif flag area. On the other hand, a file name idol01.jpg managed in record No. 012 is stored in a folder whose folder title is "graphic." Therefore, this file is found to have been downloaded, and thus, "0" is set in the DCF/Exif flag area.

By doing this, the determination as to whether combining is enabled or disabled can be made irrespective of the presence or absence of copyright information.

The above-described operations according to the embodiments can be carried out by programming them and causing a computer to execute them. At this time, a computer program can be supplied to a computer through a disk type recording medium such as a floppy disk or a hard disk; a variety of memories such as a semiconductor memory or a card type memory; or a variety of program recording mediums such as a communication network.

According to the above mentioned embodiments, when combining of multimedia data is instructed, it is determined whether or not the multimedia data targeted to be combined includes data downloaded via the network by the wireless communication function. When the determination result is affirmative, a corresponding storage address is stored, and transmission of the combined multimedia data is inhibited. Hence, when the multimedia data targeted to be combined includes data downloaded via the network or protected by copyright information, it is possible to notify to the user that transmission cannot be carried out, so that the user's usability can be improved.

It is possible to determine whether combining is enabled or disabled according to the presence or absence of copyright information.

The multimedia data combined as the content of call arrival notification can be used, and thus, the multimedia data according to the user's preference can be freely used without worrying about acquisition by use of a device incorporated in advance or acquisition by downloading.

Since the still picture data or the motion picture data is handled as one item of the multimedia data, the user can use the still picture data or the motion picture data without worrying about acquisition by picking-up or downloading.

It is possible to determine whether combining is enabled or disabled according to the presence or absence of the still picture data picked-up by the user.

When the motion picture data picked-up by the user is targeted to be combined, the multimedia data after combined is uniquely handled as motion picture data, so that the user can use motion picture data freely.

Since the sound data recorded by the user is handled as one item of the multimedia data, the multimedia data according to the user's preference can be freely used.

When the multimedia data targeted to be combined includes data downloaded via a network or protected by copyright information, it is possible to check only the combining result without combining and/or storing these items of the data, so that the user's usability can be improved.

In the case of the multimedia data which is not inhibited from being processed, the combining result is stored as new multimedia data, and thus, the user's usability can be improved.

Since the presence or absence of the flag information is used as a criterion as to whether combining of the multimedia data is enabled or disabled, the determination as to whether the combining is enabled or disabled can be easily made without making a determination based on redundant data.

Since the presence or absence of the copyright information is used as a criterion as to whether combining of the multimedia data is enabled or disabled, the determination as to whether the combining is enabled or disabled can be easily made.

When the multimedia data targeted to be combined includes data downloaded via the network or protected by copyright information, it is possible to check only the combining result without combining and/or storing items of the data, and thus, the user's usability can be improved.

In the case of the multimedia data which is not inhibited from being processed, the combining result is stored as new multimedia data, so that the user's usability can be improved.

Since the presence or absence of the flag information is used as a criterion as to whether combining of the multimedia data is enabled or disabled, the determination as to whether the combining is enabled or disabled can be made without making a determination based on redundant data.

Since the presence or absence of the copyright information is used as a criterion as to whether combing of the multimedia data is enabled or disabled, the determination as to whether the combing is enabled or disabled can be easily made.

The present invention is not limited to the above described embodiments. The present invention can be carried out according to other various modes in specific configuration, function, operation, and advantageous effect without deviating from the spirit of the invention. A similar advantageous effect can be achieved by applying the present invention to a portable wireless communication terminal PDA, a portable personal computer and the like.

What is claimed is:

1. A portable wireless communication terminal having an acquiring device which acquires multimedia data, a wireless communication function, and a downloading function for downloading multimedia data including copyright information over a network by using the wireless communication function, the portable wireless communication terminal comprising:

a memory which stores the multimedia data acquired by using the acquiring device and the multimedia data including the copyright information which is downloaded over the network;

a combining instruction issuing unit which issues a combining instruction to combine multimedia data with each other;

an outputting unit which, when the combining instruction issued by the combining instruction issuing unit is detected, reads out items of multimedia data to be combined from the memory, combines the read out data, and outputs combined multimedia data;

a first determination unit which determines whether or not the combined multimedia data output from the outputting unit includes the downloaded multimedia data including the copyright information;

a first storage control unit which, when the first determination unit determined that the combined multimedia data includes the downloaded multimedia data including the copyright information, does not store the combined multimedia data, and stores respective storage addresses of the items of multimedia data in the memory so as to be associated with each other;

a second storage control unit which, when the first determination unit determines that the combined multimedia data does not include the downloaded multimedia data including the copyright information, stores the combined multimedia data in the memory;

a transmission instruction issuing unit which issues a transmission instruction to transmit the combined multimedia data which is output from the outputting unit from the portable communication terminal;

a second determination unit which, when the transmission instruction issuing unit issues the transmission instruction, determines whether the combined multimedia data is: (i) based on the respective storage addresses stored by the first storage control unit, or (ii) stored by the second storage control unit; and a disabling unit which, when the second determining unit determines that the combined multimedia data is based on the respective storage addresses stored by the first storage control unit, disables transmission of the combined multimedia data.

2. A portable wireless communication terminal according to claim 1, further comprising a call arrival notifying unit which notifies the wireless communication terminal of call arrival by the wireless communication function, wherein the combined multimedia data is output when the call arrival is notified by the call arrival notifying unit.

3. A portable wireless communication terminal according to claim 1, wherein the acquiring device includes an image pick-up device, and the multimedia data stored in the memory comprises still picture data and motion picture data which are picked-up by the image pick-up device and still picture data and motion picture data which are downloaded over the network by the downloading function.

4. A portable wireless communication terminal according to claim 3, wherein, when the combined multimedia data output by the outputting unit does not include downloaded data and includes motion picture data picked-up by the image pick-up device, the second storage control unit causes the memory to store the combined multimedia data as motion picture data.

5. A portable wireless communication terminal according to claim 1, wherein the acquiring device includes a sound recording device, and the multimedia data stored in the memory comprises sound data recorded by the sound recording device and sound data downloaded over the network.

6. A method of operating a portable wireless communication terminal having an acquiring device which acquires multimedia data, a wireless communication function, and a downloading function for downloading multimedia data including copyright information over a network by using the wireless communication function, the method comprising:

storing, in a memory of the portable communication terminal, the multimedia data acquired by using the acquiring device and the multimedia data including the copyright information which is downloaded over the network;

issuing a combining instruction to combine multimedia data with each other;

reading out items of multimedia data to be combined from the memory, combining the read out items of multimedia data, and outputting combined multimedia data, when the combining instruction is detected;

determining whether or not the outputted combined multimedia data includes the downloaded multimedia data including the copyright information;

when it is determined that the combined multimedia data includes the downloaded multimedia data including the copyright information, storing respective storage addresses of the items of multimedia data in the memory so as to be associated with each other, and not storing the combined multimedia data;

when it is determined that the combined multimedia data does not include the downloaded multimedia data including the copyright information, storing the combined multimedia data in the memory;

issuing a transmission instruction to transmit the outputted combined multimedia data from the portable communication terminal;

determining, when the transmission instruction is issued, whether or not the combined multimedia data is: (i) based on the respective storage addresses stored in the memory unit, or (ii) stored in the memory; and disabling transmission of the combine multimedia data, when it is determined that the combined multimedia data is based on the respective storage addresses stored in the memory.

7. A method according to claim 6, further comprising notifying the wireless communication terminal of call arrival by the wireless communication function;

wherein the combined multimedia data is output when the call arrival is notified.

8. A method according to claim 6, wherein the acquiring device includes an image pick-up device, and the multimedia data stored in the memory comprises still picture data and motion picture data which are picked-up by the image pick-up device and still pictured data and motion picture data which are downloaded over the network by the downloading function.

9. A method according to claim 8, wherein, when the outputted combined multimedia data does not include downloaded data and does include motion picture data picked-up by the image pick-up device, the combined multimedia data is stored as motion picture data in the memory.

10. A method according to claim 6, wherein the acquiring device includes a sound recording device, and the multimedia data stored in the memory comprises sound data recorded by the sound recording device and sound data downloaded over the network.

* * * * *